(12) United States Patent
Uematsu et al.

(10) Patent No.: US 12,429,250 B2
(45) Date of Patent: Sep. 30, 2025

(54) HEAT-COLLECTING MEMBER AND AGRICULTURAL HOUSE

(71) Applicant: KOBE STEEL, LTD., Hyogo (JP)

(72) Inventors: Koji Uematsu, Kobe (JP); Akio Sugimoto, Kobe (JP); Hiroki Okada, Kobe (JP)

(73) Assignee: KOBE STEEL LTD., Hyogo (JP)

( * ) Notice: Subject to any disclaimer, the term of this patent is extended or adjusted under 35 U.S.C. 154(b) by 113 days.

(21) Appl. No.: 18/578,496

(22) PCT Filed: Jun. 28, 2022

(86) PCT No.: PCT/JP2022/025751
§ 371 (c)(1),
(2) Date: Jan. 11, 2024

(87) PCT Pub. No.: WO2023/021851
PCT Pub. Date: Feb. 23, 2023

(65) Prior Publication Data
US 2024/0318870 A1    Sep. 26, 2024

(30) Foreign Application Priority Data

Aug. 17, 2021   (JP) ................................. 2021-132883
Apr. 27, 2022   (JP) ................................. 2022-073721

(51) Int. Cl.
*F24S 10/70*    (2018.01)
*F24S 30/425*   (2018.01)
(Continued)

(52) U.S. Cl.
CPC ............. *F24S 10/70* (2018.05); *F24S 30/425* (2018.05); *F24S 50/80* (2018.05); *F24S 80/60* (2018.05);
(Continued)

(58) Field of Classification Search
CPC .......... F24S 10/70; F24S 30/425; F24S 50/80; F24S 80/60; F24S 2010/71; F24S 2080/05
(Continued)

(56) References Cited

U.S. PATENT DOCUMENTS 4,318,781 A * 3/1982 Iida .......................... C02F 1/14
                                                203/DIG. 1
4,509,502 A    4/1985 Youcha
(Continued)

FOREIGN PATENT DOCUMENTS

CN          120160301 A  *  6/2025
EP          3537052 A1  *  9/2019  ............. F24S 10/70
(Continued)

OTHER PUBLICATIONS

International Preliminary Report on Patentability and Written Opinion issued in PCT/JP2022/025751; mailed Feb. 29, 2024.
(Continued)

*Primary Examiner* — Jon T. Schermerhorn, Jr.
(74) *Attorney, Agent, or Firm* — Studebaker Brackett PLLC

(57) ABSTRACT

A heat collector includes a body including a hollow portion extending from a first end to a second end of the body and being a metal-extruded body having a light-receiving surface to receive sunlight, a pair of lids adjacent to the first end and the second end and covering the hollow portion, an inlet located in one of the pair of lids to allow a heating medium to enter the hollow portion, and an outlet located in one of the pair of lids to allow the heating medium to exit the hollow portion.

26 Claims, 21 Drawing Sheets

(51) Int. Cl.
  *F24S 50/80* (2018.01)
  *F24S 80/00* (2018.01)
  *F24S 80/60* (2018.01)

(52) U.S. Cl.
  CPC ........ *F24S 2010/71* (2018.05); *F24S 2080/05* (2018.05)

(58) Field of Classification Search
  USPC .......................................................... 165/10
  See application file for complete search history.

(56) References Cited

U.S. PATENT DOCUMENTS

| | | | |
|---|---|---|---|
| 9,212,829 B1 * | 12/2015 | Friesel | F24S 70/60 |
| 9,404,673 B2 * | 8/2016 | Swift | F24S 20/67 |
| 11,486,608 B2 * | 11/2022 | Nakamura | F25B 49/043 |
| 2006/0251865 A1 | 11/2006 | Hinterneder | |
| 2009/0126717 A1 | 5/2009 | Nass | |
| 2010/0206300 A1 | 8/2010 | Shabtay et al. | |
| 2011/0192393 A1 | 8/2011 | Swift et al. | |
| 2012/0060898 A1 | 3/2012 | Ahlgren et al. | |
| 2012/0174478 A1 | 7/2012 | Chen et al. | |
| 2017/0023277 A1 | 1/2017 | Petursson | |
| 2020/0056813 A1 * | 2/2020 | Mochizuki | F24S 80/56 |

FOREIGN PATENT DOCUMENTS

| | | | | |
|---|---|---|---|---|
| FR | 2 911 388 A1 | | 7/2008 | |
| JP | S5971948 A | * | 4/1984 | |
| JP | S6071854 A | * | 4/1985 | ............. F24S 10/90 |
| JP | H04302952 A | * | 10/1992 | |
| JP | H06-147650 A | | 5/1994 | |
| JP | 2003-139413 A | | 5/2003 | |
| JP | 2006-515414 A | | 5/2006 | |
| JP | 2008-544205 A | | 12/2008 | |
| JP | 2012-077976 A | | 4/2012 | |
| JP | 2012-242016 A | | 12/2012 | |
| JP | 2013-535959 A | | 9/2013 | |
| JP | 2014-150757 A | | 8/2014 | |
| JP | 2018-017444 A | | 2/2018 | |
| WO | 91/04403 A1 | | 4/1991 | |
| WO | 2003/085329 A1 | | 10/2003 | |

OTHER PUBLICATIONS

International Search Report issued in PCT/JP2022/025751; mailed Sep. 13, 2022.

The extended European search report issued by the European Patent Office on Sep. 4, 2024, which corresponds to European Patent Application No. 22858174.0-1002 and is related to U.S. Appl. No. 18/578,496.

* cited by examiner (Winter)

(Summer)

HEAT-COLLECTING MEMBER AND AGRICULTURAL HOUSE

TECHNICAL FIELD

The present invention relates to a heat collector and an agricultural greenhouse including the heat collector.

BACKGROUND ART

A known heat collector stores heat from sunlight into a heating medium. The heat collector is installed in, for example, an agricultural greenhouse. The heat collector installed in the agricultural greenhouse stores heat during the day and uses the heat to warm the air in the agricultural greenhouse at night.

Patent Document 1 describes a heat collector including a hollow frame including a transparent layer, a heat collecting portion with a flow channel fitted in and fixed to the frame, and a heat insulating layer.

PRIOR ART DOCUMENTS

Patent Documents

Patent Document 1: Japanese Unexamined Patent Application Publication No. 2012-242016

SUMMARY OF THE INVENTION

Problems to be Solved by the Invention

The heat collector described in Patent Document 1 includes numerous components and has a complicated structure. The heat collector thus has complicated manufacturing processes, possibly involving more manufacturing workhours. In cloudy weather or in winter when solar energy with decreased density is received on the heat collecting surface, the fluid flowing through the flow channel may carry an insufficient amount of heat.

One or more aspects of the present invention are directed to a heat collector with a simplified structure and an agricultural greenhouse including the heat collector.

Solutions to the Problems

A heat collector according to a first aspect of the present invention includes a body including a hollow portion extending from a first end to a second end of the body and being a metal-extruded body having a light-receiving surface to be irradiated with sunlight, a pair of lids adjacent to the first end and the second end, respectively, and covering the hollow portion, an inlet located in one of the pair of lids to allow a heating medium to enter the hollow portion, and an outlet located in one of the pair of lids to allow the heating medium to exit the hollow portion.

The heat collector according to the above aspect of the present invention converts sunlight received by the metal body to heat, and stores the heat into the heating medium. The heat collector simply includes the extruded body, the lids covering the hollow portion in the body, the inlet, and the outlet, and thus includes fewer components. The heat collector thus has a simplified structure, and simplified manufacturing processes involving fewer manufacturing workhours. The body is formed by extrusion molding and can thus be easily formed to have one of variable lengths.

The hollow portion may include a first flow channel through which the heating medium flows from the first end toward the second end, and a second flow channel through which the heating medium flows from the second end toward the first end. The second flow channel may be adjacent to the first flow channel with a partition wall between the first flow channel and the second flow channel.

In the above structure, the hollow portion includes two flow channels that provide a long flow length for the heating medium, thus increasing the area of contact between the body and the heating medium. This allows efficient transfer of heat from the body heated by sunlight to the heating medium.

The partition wall may have a connection hole connecting the first flow channel and the second flow channel to cause the heating medium to meander from the inlet toward the outlet.

In the above structure, the heating medium meanders when flowing, thus increasing the area of contact with the body and having a longer time of contact with the body. The heat collector can thus store heat from sunlight efficiently into the heating medium. The body is machined to form the connection hole to create the meandering flow channels for the heating medium. The lids can thus be manufactured easily without machining to form the meandering flow channels.

Each of the pair of lids may include a connection channel connecting the first flow channel and the second flow channel to cause the heating medium to meander from the inlet toward the outlet.

In the above structure, the heating medium meanders when flowing, thus increasing the area of contact with the body and having a longer time of contact with the body. The heat collector can thus store heat from sunlight efficiently into the heating medium. The lids are machined to form the connection channels to create the meandering flow channels for the heating medium. The body can thus be manufactured easily without machining to form the meandering flow channels.

The first flow channel aligned with the inlet may have a smaller flow channel cross-sectional area than the second flow channel.

In the above structure, the heating medium undergoes a pressure drop in the first flow channel aligned with the inlet and thus decelerates, thus having a longer time of contact with the body. This increases the efficiency of heating the heating medium.

The hollow portion may include a plurality of the first flow channels through which the heating medium flows from the first end toward the second end. The plurality of first flow channels may be adjacent to one another with a partition wall between adjacent first flow channels of the plurality of first flow channels.

In the above structure, the heating medium flows in one direction through the plurality of first flow channels, thus with an increased flow rate.

The structural member body may include a plurality of recesses adjacent to the first end and the second end. The plurality of recesses may connect ends of the plurality of first flow channels. Each of the pair of lids may include an inlet/outlet flow channel connecting the inlet or the outlet with one of the plurality of recesses.

The above structure allows the heating medium to easily have an increased rate of flow through the plurality of first flow channels.

Each of the pair of lids may include a common channel connecting with opening ends of the plurality of first flow channels to cause the heating medium to flow from the inlet to the plurality of first flow channels, merge after flowing through the plurality of first channels, and flow toward the outlet.

The above structure allows the heating medium to easily have an increased rate of flow through the plurality of first flow channels.

The heat collector may further include a support supporting the body at an adjustable angle.

In the above structure, the angle of the body can be adjusted with the support to receive sunlight on the light-receiving surface.

The body may be a panel. The body may include a heat collecting portion on a front surface of the panel and a reflective portion on a back surface of the panel. The heat collecting portion may collect heat from the received sunlight. The reflective portion may reflect the received sunlight. The support may support the body at an angle adjustable between a heat collecting position at which the heat collecting portion faces upward and a light-blocking position at which the reflective portion faces upward.

In the above structure, the heat collecting portion or the reflective portion is selectively directed upward to receive sunlight. The support can adjust the angle to switch between a mode in which the heat collecting portion collects heat from sunlight and a mode in which the reflective portion reflects sunlight.

The heat collecting portion may include a cover covering the front surface of the body and a fin protruding from the cover.

In the above structure, the heat collecting portion includes the fin to provide a larger area for receiving sunlight. This enhances heat collection.

The heat collecting portion may be painted black.

The above structure allows the heat collecting portion to collect heat with a simple method.

The body may contain an aluminum alloy, and the reflective portion may be the back surface with the aluminum alloy being exposed.

The above structure allows the reflective portion to block light with a simple method.

The body may include a stepped portion in a cross section perpendicular to a direction in which the body extends.

In the above structure, the stepped portion increases the area for receiving sunlight, thus increasing the efficiency of heating the heating medium. This structure can thus respond to decreased density of solar energy.

The body may include a curved portion in a cross section perpendicular to a direction in which the body extends.

In the above structure, the curved portion increases the area for receiving sunlight, thus increasing the efficiency of heating the heating medium. This structure can thus respond to decreased density of solar energy.

The hollow portion may include a first rib in a direction in which the hollow portion extends.

In the above structure, the first rib increases the area of contact between the body and the heating medium. This allows heat converted from sunlight received by the body to be efficiently transferred to and stored into the heating medium. This structure can thus respond to decreased density of solar energy. The body is an extruded product. The first rib can thus be formed easily.

The hollow portion may include a first recess in a direction in which the hollow portion extends.

In the above structure, the first recess increases the area of contact between the body and the heating medium. This allows heat converted from sunlight received by the body to be efficiently transferred to and stored into the heating medium. This structure can thus respond to decreased density of solar energy. The body is an extruded product. The first recess can thus be formed easily.

The light-receiving surface may include a second rib in a direction in which the body extends.

The above structure includes the second rib, thus increasing the area for receiving sunlight on the body. In other words, the heating medium can be heated by sunlight received by the second rib, in addition to sunlight received on the light-receiving surface. This increases the efficiency of heating the heating medium. This structure can thus respond to decreased density of solar energy. The body is an extruded product. The second rib can thus be formed easily.

The light-receiving surface may include a second recess in a direction in which the body extends.

The above structure includes the second recess, thus increasing the area for receiving sunlight on the body. In other words, the heating medium can be heated by sunlight received by the second recess, in addition to sunlight received on the light-receiving surface. This increases the efficiency of heating the heating medium. This structure can thus respond to decreased density of solar energy. The body is an extruded product. The second recess can thus be formed easily.

The light-receiving surface may be coated with a black film.

The above structure allows the light-receiving surface to have higher emissivity, thus increasing the efficiency of heating the heating medium with sunlight.

The heat collector may further include a heat insulator on an outer surface of the body except the light-receiving surface.

The above structure reduces or prevents the release of heat from the heated heating medium or the body to, for example, the atmosphere. This increases the efficiency of heating the heating medium.

The body may include an upper wall being a plate, a lower wall being a plate and facing the upper wall, and a pair of side walls each connecting an end of the upper wall and an end of the lower wall.

The upper wall may include flanges protruding from the upper wall beyond the pair of side walls. The light-receiving surface may include an upper surface of the upper wall and upper surfaces of the flanges to face the sun.

The above structure increases the area for receiving sunlight, thus increasing the efficiency of heating the heating medium.

The partition wall may be thicker than the upper wall, the lower wall, and the pair of side walls.

The above structure has less heat exchange between the first flow channel and the second flow channel that are adjacent to each other. When, for example, the temperature of the heating medium flowing through the second flow channel is higher than the temperature of the heating medium flowing through the first flow channel, the structure has less heat transfer from the heating medium flowing through the second flow channel to the heating medium flowing through the first flow channel, thus maintaining the high temperature of the heating medium in the second flow channel.

An agricultural greenhouse according to a second aspect of the present invention includes one or more heat collectors described above.

Each of the one or more heat collectors may include the body being a panel and supported by a structural member of the agricultural greenhouse at an adjustable angle. The body may include a heat collecting portion on a front surface of the panel and a reflective portion on a back surface of the panel. The heat collecting portion may collect heat from received sunlight. The reflective portion may reflect received sunlight. The agricultural greenhouse may further include a rotator that synchronously changes angles of the one or more heat collectors with respect to the structural member.

Effects of the Invention

The heat collector and the agricultural greenhouse including the heat collector according to the above aspects of the present invention each have a simplified structure.

DETAILED DESCRIPTION

First Embodiment

Figure 1:
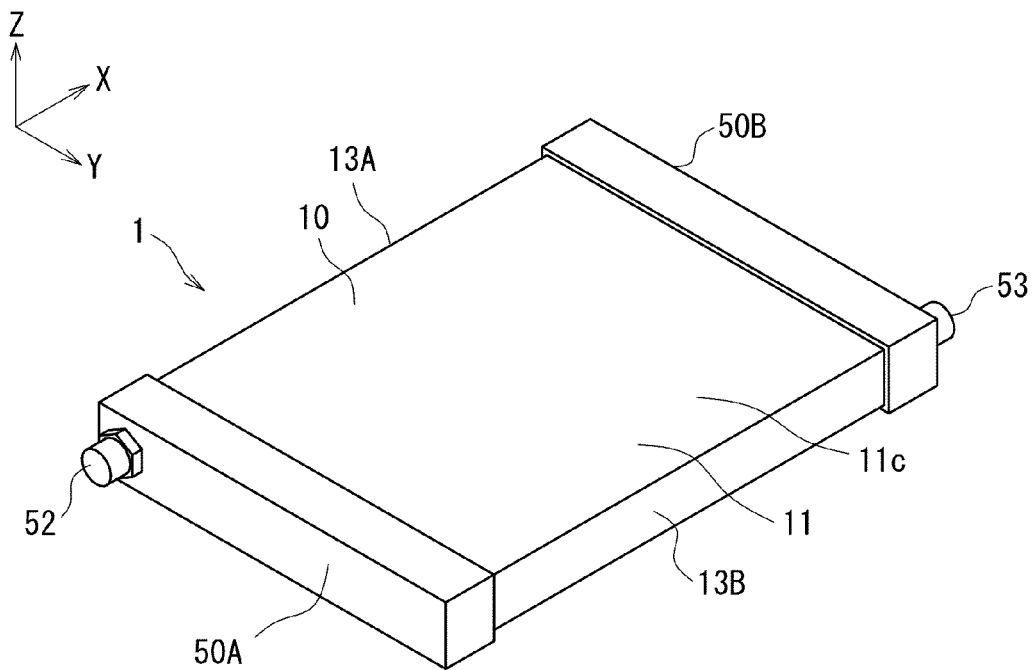
FIG. 1 is a perspective view of a heat collector according to a first embodiment of the present invention.

Referring to FIG. 1, a heat collector 1 according to the present embodiment includes a body 10 and a pair of lids 50A and 50B.

Figure 2:
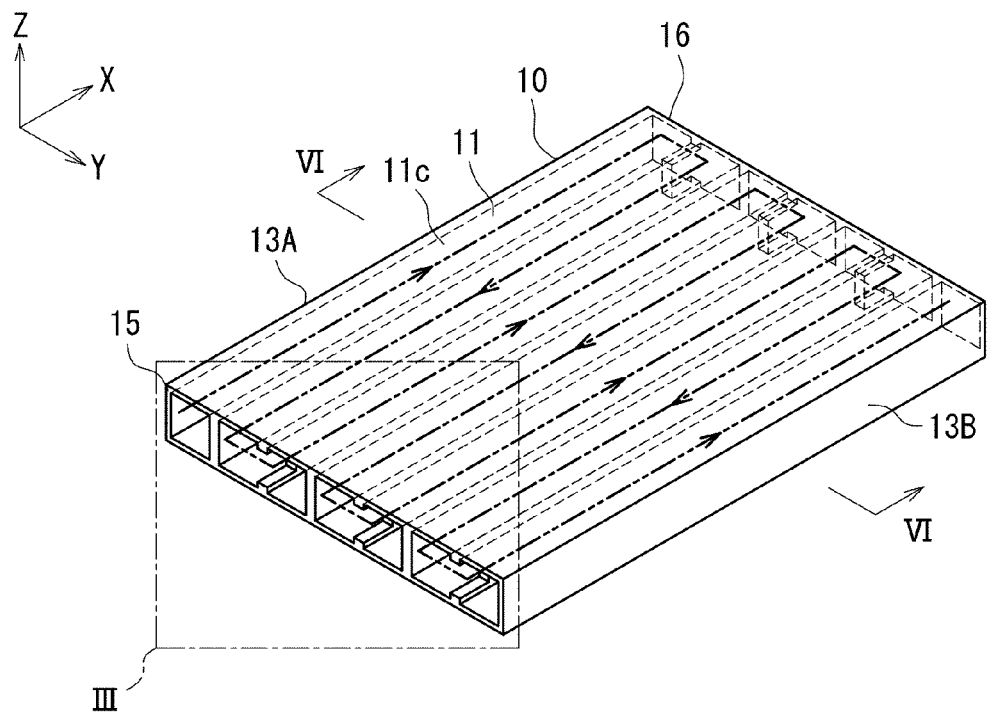
FIG. 2 is a perspective view of a body in the first embodiment of the present invention showing a first end.
Figure 4:
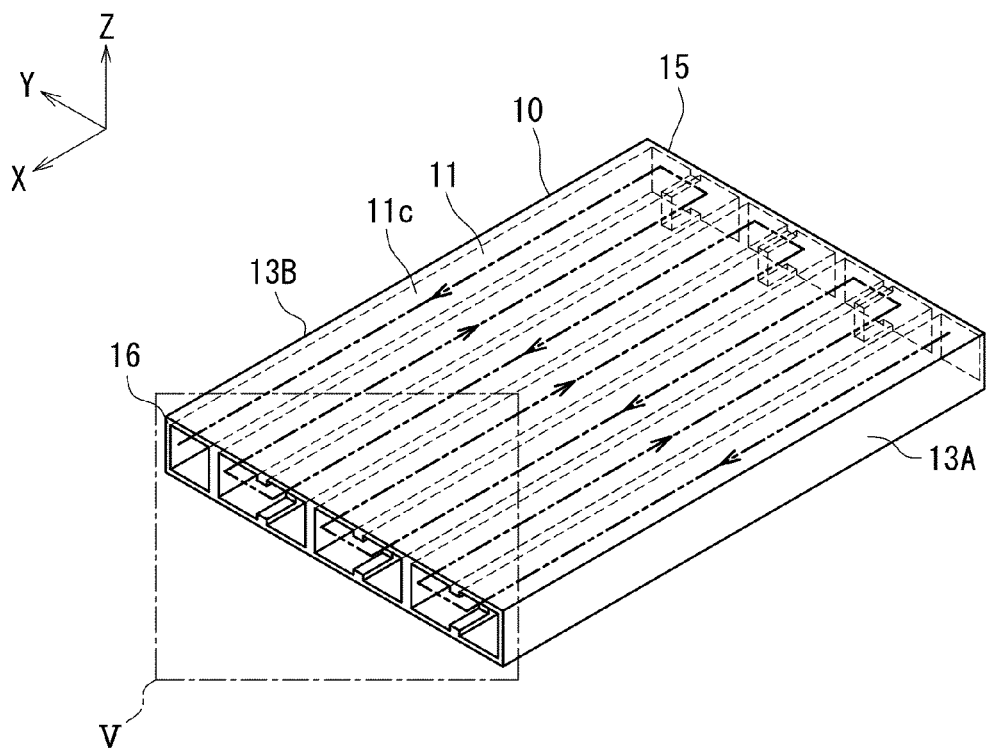
FIG. 4 is a perspective view of the body in the first embodiment of the present invention showing a second end.

Referring to FIGS. 2 and 4, the body 10 is formed by extrusion molding of metal. The body 10 is a panel as an elongated rectangular prism. In the present embodiment, the body 10 is extruded to have a first end 15 and a second end 16.

In the present embodiment, the body 10 is formed from an aluminum alloy. The body 10 may have a thermal conductivity higher than or equal to 200 W/(m·K). The body 10 may be formed from, for example, aluminum, copper, a copper alloy, or silver.

Figure 6:
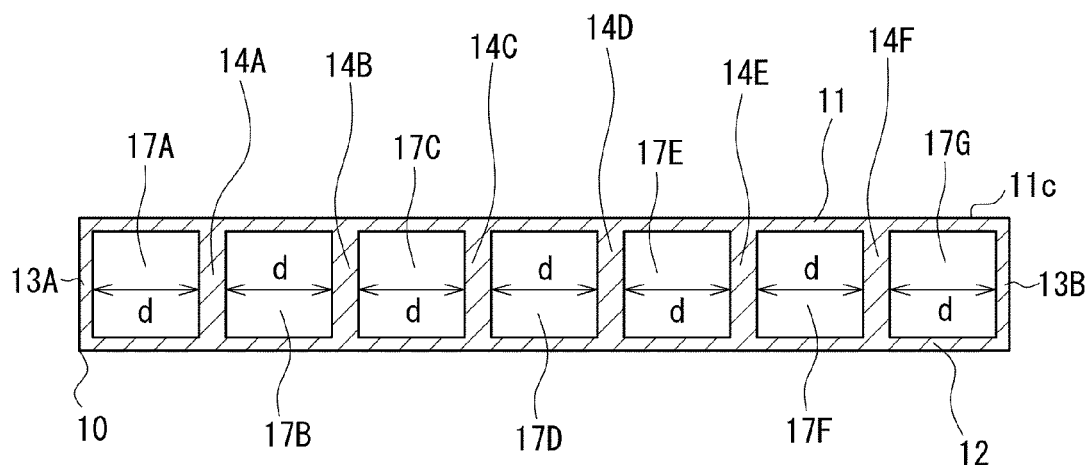
FIG. 6 is a sectional view taken along line VI-VI in FIG. 2.

Referring also to FIG. 6, the body 10 includes a flat upper wall 11, a flat lower wall 12 facing the upper wall 11, and a pair of side walls 13A and 13B that connect ends of the upper wall 11 and the lower wall 12 and extend in an extension direction in which the body 10 extends. The body 10 also includes partition walls 14A, 14B, 14C, 14D, 14E, and 14F that each connect the upper wall 11 and the lower wall 12 inside the body 10 and extend in the extension direction of the body 10. The partition walls 14A to 14F are spaced apart from one another. In the present embodiment, a distance d between adjacent two of the partition walls 14A to 14F is constant.

Hereafter, the direction from the first end 15 toward the second end 16 is referred to as X-direction, the direction from the side wall 13A toward the side wall 13B is referred to as Y-direction, and the direction orthogonal to X-direction and Y-direction is referred to as Z-direction.

The body 10 includes a hollow portion 20 with open ends.

The hollow portion 20 includes four first flow channels 17A, 17C, 17E, and 17G that extend in X-direction inside the body 10 and allow a heating medium to flow from the first end 15 toward the second end 16. The hollow portion 20 also includes three second flow channels 17B, 17D, and 17F that extend in X-direction inside the body 10 and allow the heating medium to flow from the second end 16 toward the first end 15. In the present embodiment, the first flow channel 17A is a space extending in X-direction defined by the upper wall 11, the lower wall 12, the side wall 13A, and the partition wall 14A. The first flow channel 17A has a substantially rectangular cross section perpendicular to X-direction. Similarly to the first flow channel 17A, the first flow channels 17C, 17E, and 17G and the second flow channels 17B, 17D, and 17F are spaces defined by the upper wall 11, the lower wall 12, the partition walls 14A to 14F, and the side wall 13B. In other words, the partition walls 14A to 14F separate the first flow channels 17A, 17C, 17E, and 17G and the second flow channels 17B, 17D, and 17F from one another.

Figure 3:
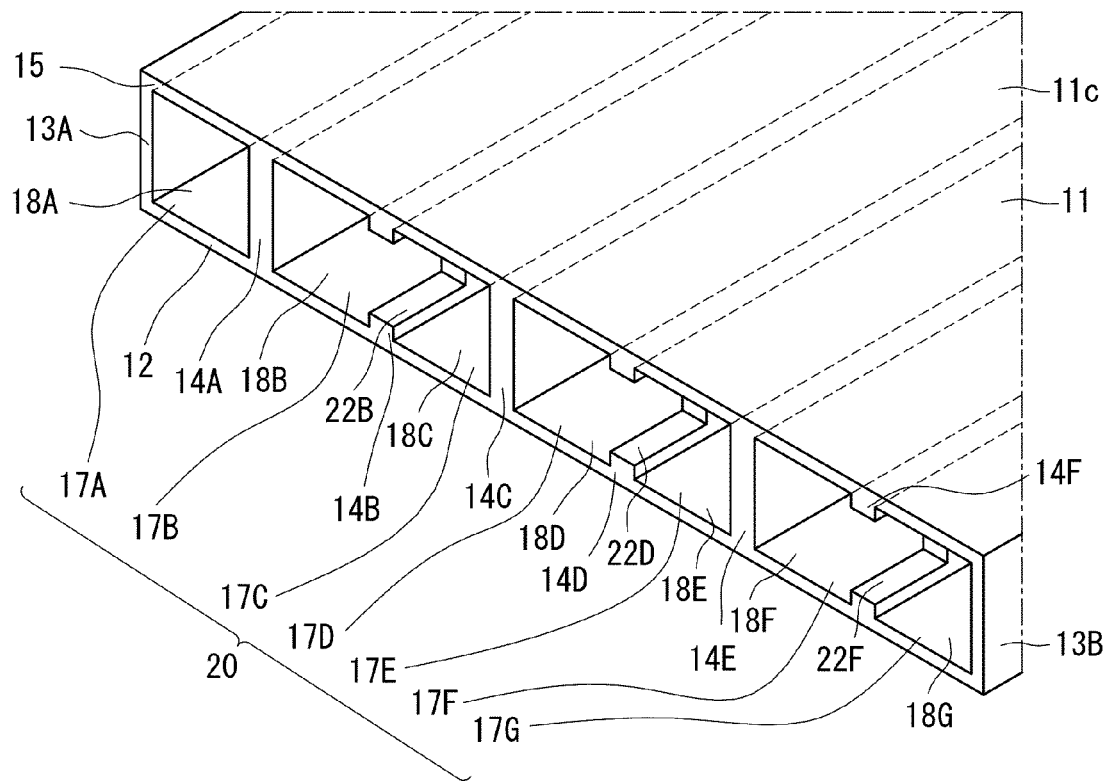
FIG. 3 is an enlarged view of part III in FIG. 2.

Referring to FIG. 3, the partition wall 14B has a connection hole 22B adjacent to the first end 15. Similarly, the partition wall 14D has a connection hole 22D adjacent to the first end 15, and the partition wall 14F has a connection hole 22F adjacent to the first end 15. The second flow channel 17B connects with the first flow channel 17C through the connection hole 22B. The second flow channel 17D connects with the first flow channel 17E through the connection hole 22D. The second flow channel 17F connects with the first flow channel 17G through the connection hole 22F.

Figure 5:
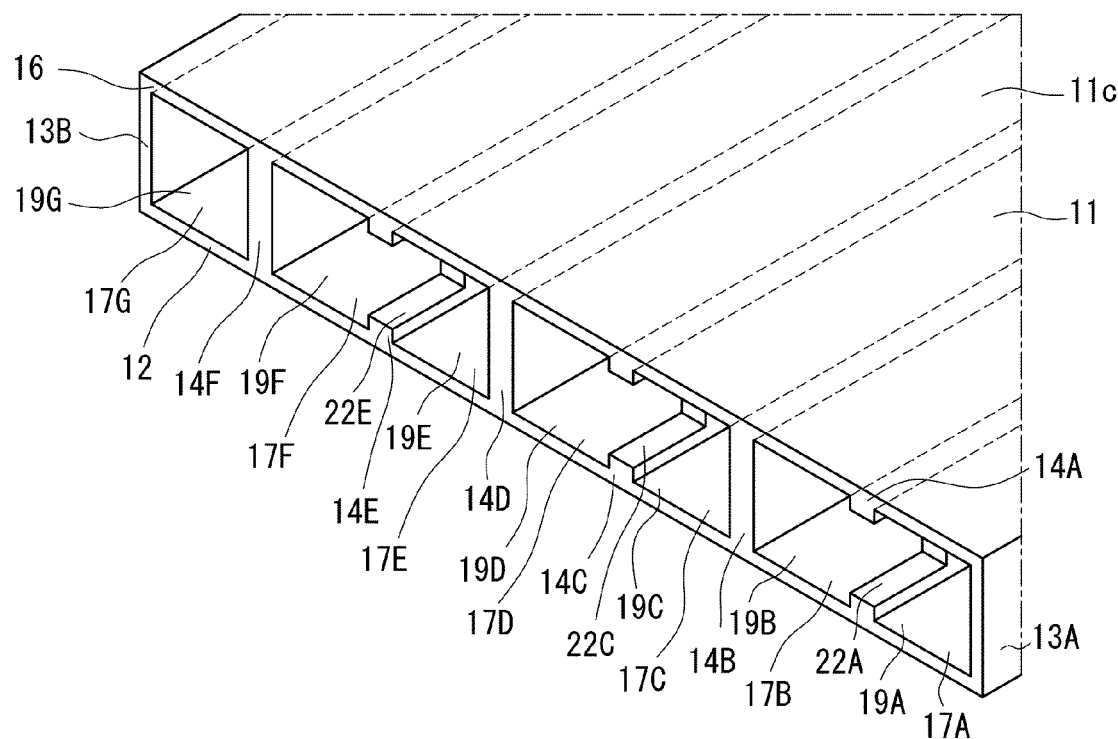
FIG. 5 is an enlarged view of part V in FIG. 4.

Referring to FIG. 5, the partition wall 14A has a connection hole 22A adjacent to the second end 16. Similarly, the partition wall 14C has a connection hole 22C adjacent to the second end 16, and the partition wall 14E has a connection hole 22E adjacent to the second end 16. The first flow channel 17A connects with the second flow channel 17B through the connection hole 22A. The first flow channel 17C connects with the second flow channel 17D through the connection hole 22C. The first flow channel 17E connects with the second flow channel 17F through the connection hole 22E.

In the present embodiment, the connection holes 22A to 22F are formed by cutting the extruded product by machining. The connection holes 22A to 22F are substantially rectangular. The connection holes 22A to 22F may be semicircular. The connection holes 22A to 22F have an area substantially equal to the area of the first flow channel 17A in a cross section perpendicular to X-direction.

Figure 7:
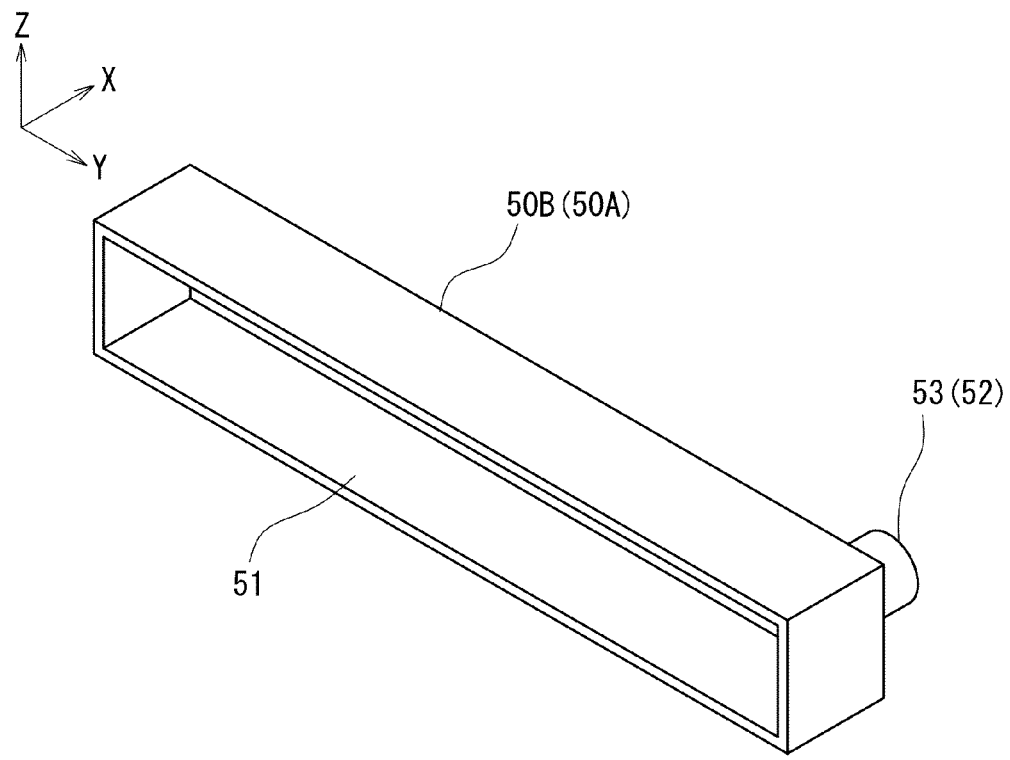
FIG. 7 is a perspective view of a lid in the first embodiment of the present invention.

Referring to FIGS. 1 and 7, the lids 50A and 50B have a cross section perpendicular to X-direction with a shape similar to the shape of the body 10. Each of the lids 50A and 50B is a rectangular prism elongated in Y-direction and has the same structure. In the present embodiment, the lid 50A is located adjacent to the first end 15 (refer to FIG. 2), and the lid 50B is located adjacent to the second end 16 (refer to FIG. 2).

In the present embodiment, the lids 50A and 50B are formed by cutting an aluminum alloy by machining. The lids 50A and 50B may have a thermal conductivity higher than or equal to 200 W/(m·K). The lids 50A and 50B may be formed from, for example, aluminum, copper, a copper alloy, or silver.

Referring to FIGS. 5 and 7, the lid 50B includes a recessed portion 51 that is hollow. The recessed portion 51 has a cross section perpendicular to X-direction with the same shape as the body 10. The recessed portion 51 receiving the second end 16 of the body 10 covers second openings 19A, 19C, 19E, and 19G adjacent to the second end 16 in the respective first flow channels 17A, 17C, 17E, and 17G. Similarly, the recessed portion 51 receiving the second end 16 of the body 10 covers second openings 19B, 19D, and 19F adjacent to the second end 16 in the respective second flow channels 17B, 17D, and 17F. The lid 50B is fixed to the body 10 with any fixing method such as welding.

Referring to FIGS. 3 and 7, the lid 50A includes a recessed portion 51 that is hollow. The recessed portion 51 has a cross section perpendicular to X-direction with the same shape as the body 10. The recessed portion 51 receiving the first end 15 of the body 10 covers first openings 18A, 18C, 18E, and 18G adjacent to the first end 15 in the respective first flow channels 17A, 17C, 17E, and 17G. Similarly, the recessed portion 51 receiving the first end 15 of the body 10 covers first openings 18B, 18D, and 18F adjacent to the first end 15 in the respective second flow channels 17B, 17D, and 17F. The lid 50A is fixed to the body 10 with any fixing method such as welding.

Referring to FIGS. 1 and 5, the lid 50B includes an outlet 53 aligned with the opening 19G. In the present embodiment, the heating medium exits the first flow channel 17G through the outlet 53.

Referring to FIGS. 1 and 3, the lid 50A includes an inlet 52 aligned with the opening 18A. In the present embodiment, the heating medium enters the first flow channel 17A through the inlet 52.

The lid 50A may include both the inlet 52 and the outlet 53. In this case, the body 10 includes, for example, the three first flow channels 17A, 17C, and 17E and the three second flow channels 17B, 17D, and 17F, although not shown. The lid 50B may include both the inlet 52 and the outlet 53.

The heat collector 1 according to the present embodiment causes the heating medium to enter the heat collector 1 through the inlet 52 and to exit the heat collector 1 through the outlet 53. The heating medium is neutral to slightly alkaline to avoid rusting of the aluminum alloy. More specifically, the heating medium has a pH of 6 to 11.

Referring to FIGS. 2 and 4, the heating medium entering the body 10 meanders through the body 10 as indicated by the two-dot-dash line.

More specifically, referring to FIGS. 1, 3, and 5, the heating medium entering through the inlet 52 flows from the first end 15 toward the second end 16 through the first flow channel 17A and enters the second flow channel 17B through the connection hole 22A. The heating medium entering the second flow channel 17B flows from the second end 16 toward the first end 15 and enters the first flow channel 17C through the connection hole 22B. In the same manner, the heating medium entering the first flow channel 17C flows through the connection holes 22C to 22F, the first flow channels 17C, 17E, and 17G, and the second flow channels 17D and 17F, and exits the heat collector 1 through the outlet 53. In other words, the heating medium meanders from the inlet 52 toward the outlet 53 through the first flow channels 17A, 17C, 17E, and 17G, the second flow channels 17B, 17D, and 17F, and the connection holes 22A to 22F.

Figure 8:
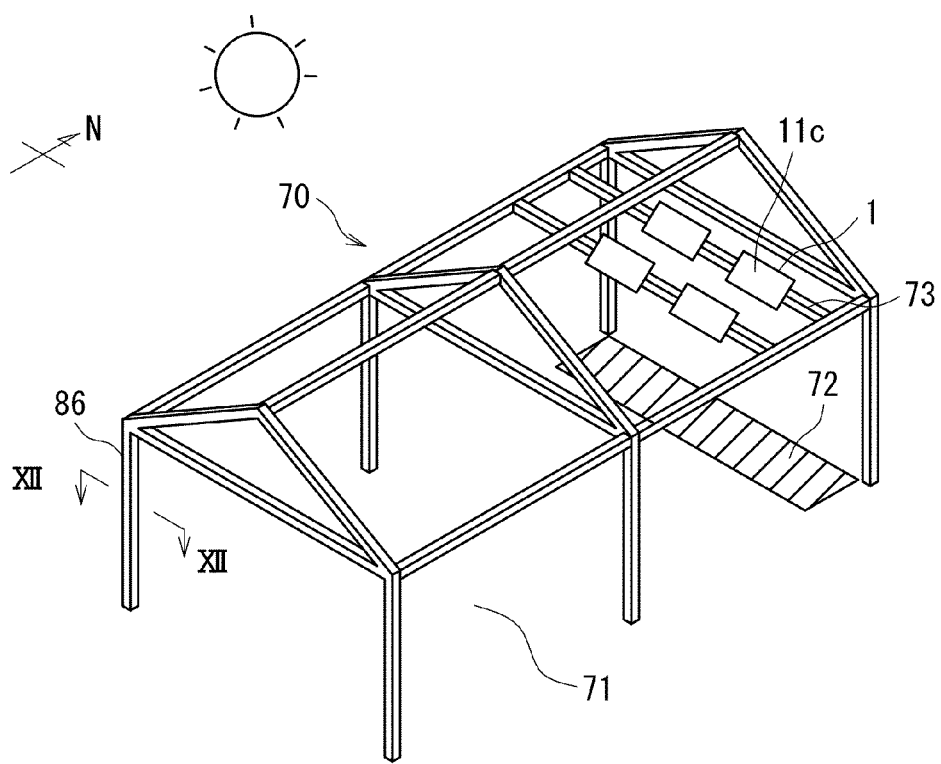
FIG. 8 is a schematic diagram of an agricultural greenhouse with heat collectors according to the first embodiment of the present invention installed.

Referring to FIG. 8, heat collectors 1 according to the present embodiment are installed in an agricultural greenhouse 70. In the agricultural greenhouse 70, plants such as vegetables are grown. The agricultural greenhouse 70 includes a cultivation area 71 in its south area with good insolation conditions and a non-cultivation area 72 (hatched in the figure) in its north area with poor insolation conditions. Crops are grown in the cultivation area 71. No crops are grown in the non-cultivation area 72. The non-cultivation area 72 is, for example, a walkway or a material storage area. In the present embodiment, the heat collectors 1 are located in an upper part in the north area of the agricultural greenhouse 70 to cast a shadow on the non-cultivation area 72. The heat collectors 1 are located so that upper surfaces (light-receiving surfaces) 11c of the upper walls 11 are irradiated with sunlight.

Figure 9:
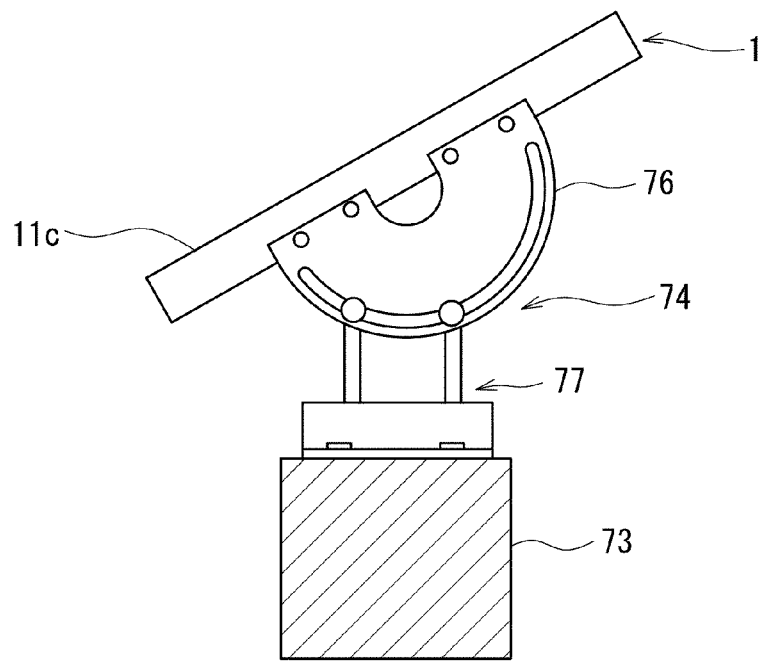
FIG. 9 is a side view of an installed heat collector according to the first embodiment of the present invention.
Figure 10:
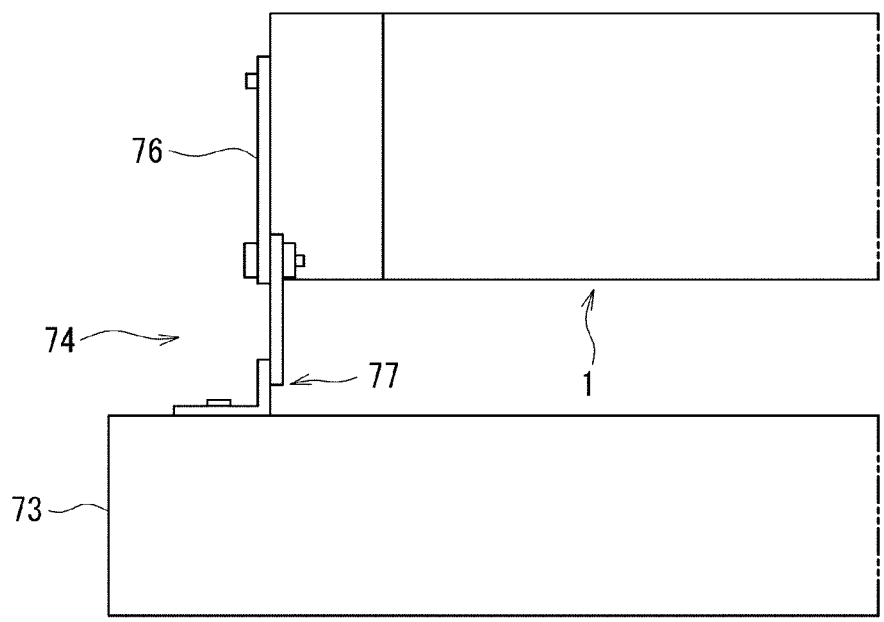
FIG. 10 is a rear view of the installed heat collector according to the first embodiment of the present invention.

Referring also to FIGS. 9 and 10, the agricultural greenhouse 70 includes a beam 73 in the upper part. Each heat collector 1 is installed on the beam 73 with a support 74. The support 74 supports the heat collector 1 at an adjustable installation angle. More specifically, the support 74 includes a rotary plate 76 and a leg 77. The heat collector 1 is fixed to the rotary plate 76. The leg 77 is fixed to the beam 73. The rotary plate 76 is rotatably fixed to the leg 77 and can thus adjust the angle of the heat collector 1. This allows the heat collector 1 to be located with the upper surface 11c of the body 10 facing the sun.

Figure 11:
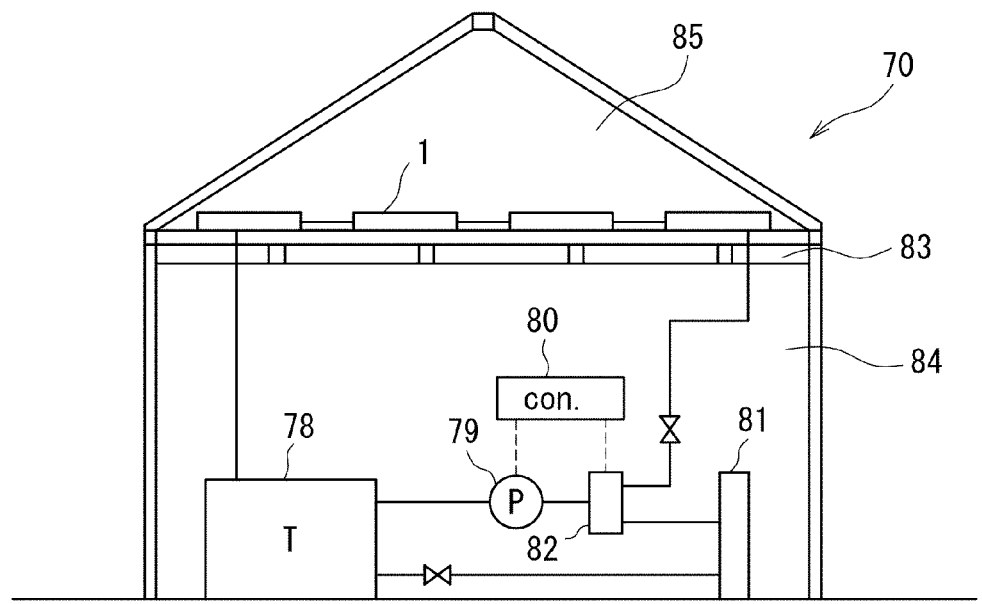
FIG. 11 is a schematic diagram of the agricultural greenhouse with the heat collectors according to the first embodiment of the present invention installed.

Referring to FIG. 11, an example use of the heat collectors 1 according to the present embodiment in the agricultural greenhouse 70 will be described.

The agricultural greenhouse 70 includes a tank 78, a pump 79, a controller 80, and a radiator 81. The tank 78 stores a heating medium. The heating medium is fed, through a three-way valve 82, to the heat collectors 1 or the radiator 81 by the pump 79 that is fluidically connected to the tank 78.

The radiator 81 allows heat exchange between the heating medium and the air in the agricultural greenhouse 70. The heated heating medium flows through the radiator 81. This warms the air in the agricultural greenhouse 70 and cools the heating medium. In the present embodiment, each heat collector 1 is used as the radiator 81. The radiator 81 may be, for example, a tube running on the ground in the cultivation area 71.

The agricultural greenhouse 70 includes a cultivation space 84 and an upper space 85. The cultivation space 84 is a space below the beam 73. The upper space 85 is a space above the cultivation space 84, including the beam 73. The heat collectors 1 are located in the upper space 85. The radiator 81 is located in the cultivation space 84. The cultivation space 84 and the upper space 85 may be partitioned by a curtain 83. The curtain 83 prevents heat transfer between the cultivation space 84 and the upper space 85, thus enhancing heat retention in the cultivation space 84.

While the heat collectors 1 are receiving sunlight during the day, the controller 80 controls the three-way valve 82 to cause the heating medium stored in the tank 78 to be pumped by the pump 79 toward the heat collectors 1 and circulated. Through this process, the heating medium is heated by the heat collectors 1 to increase its temperature. While the heat collectors 1 are receiving no sunlight at night, the controller 80 controls the three-way valve 82 to cause the heating medium stored in the tank 78 to be pumped by the pump 79 toward the radiator 81 and circulated. Through this process, heat from the heated heating medium is transferred to the air in the cultivation space 84 through the radiator 81, thus raising the temperature in the cultivation space 84. This reduces the likelihood that plant growth decelerates at lower temperature at night, thus increasing the plant growth rate.

Figure 12:
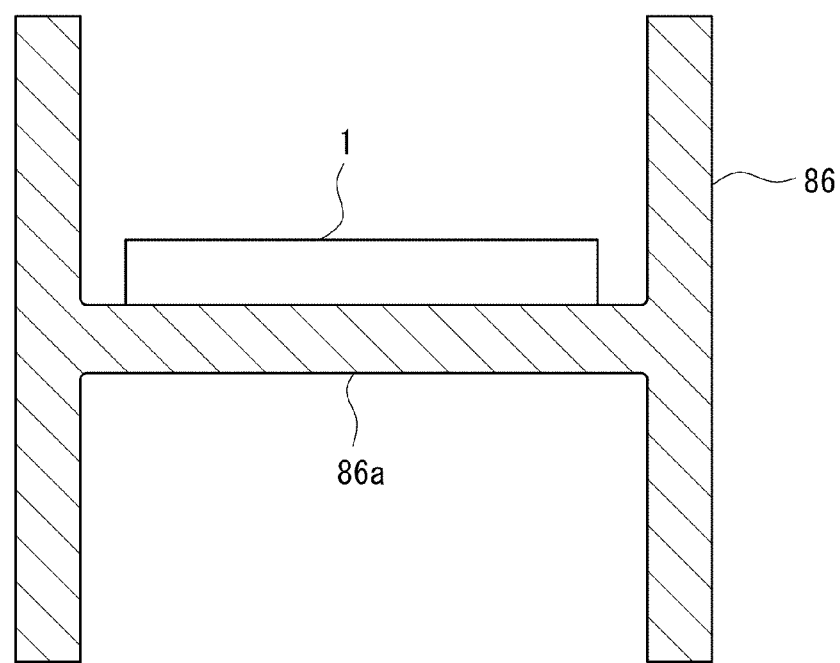
FIG. 12 is a sectional view taken along line XII-XII in FIG. 8 in a modification.

Referring to FIG. 12, each heat collector 1 may be installed on a post 86 of the agricultural greenhouse 70 in a modification of the present embodiment. The post 86 in the modification is a steel H-beam. The heat collector 1 is installed on a surface of a web 86a of the post 86 that receives sunlight, with the upper surface 11c facing the sun.

The heat collector 1 installed on the post 86 is less likely to cast a shadow or can prevent a shadow from casting on the cultivation area 71.

The heat collector 1 according to the present embodiment converts sunlight received by the body 10 formed from a metal to heat and stores the heat into a heating medium. The heat collector 1 simply includes the extruded body 10, the lids 50A and 50B covering the hollow portion 20 in the body 10, the inlet 52, and the outlet 53, and thus includes fewer components. The heat collector thus has a simplified structure, and simplified manufacturing processes involving fewer manufacturing workhours. The body 10 is formed by extrusion molding and can thus be easily formed to have one of variable lengths.

The hollow portion 20 includes the two kinds of flow channels that provide a long flow length for the heating medium, thus increasing an area of contact between the body 10 and the heating medium. This allows efficient transfer of heat from the body 10 heated by sunlight to the heating medium.

The heating medium meanders when flowing, thus increasing the area of contact with the body 10 and having a longer time of contact with the body 10. The heat collector 1 can thus store heat from sunlight efficiently into the heating medium. The body 10 is machined to form the connection holes 22A to 22F to create the meandering flow channels for the heating medium. The lids 50A and 50B can thus be manufactured easily without machining to form the meandering flow channels.

The angle of the body 10 can be adjusted by the support 74 to receive sunlight on the upper surface 11c.

Second Embodiment

Figure 13:
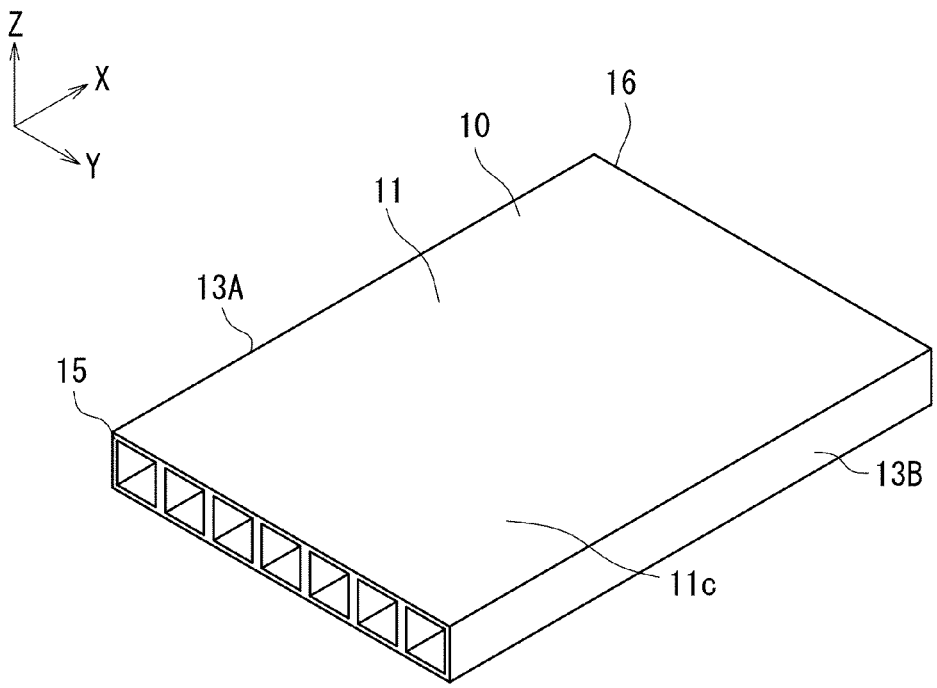
FIG. 13 is a perspective view of a body in a second embodiment of the present invention similar to FIG. 2.
Figure 14:
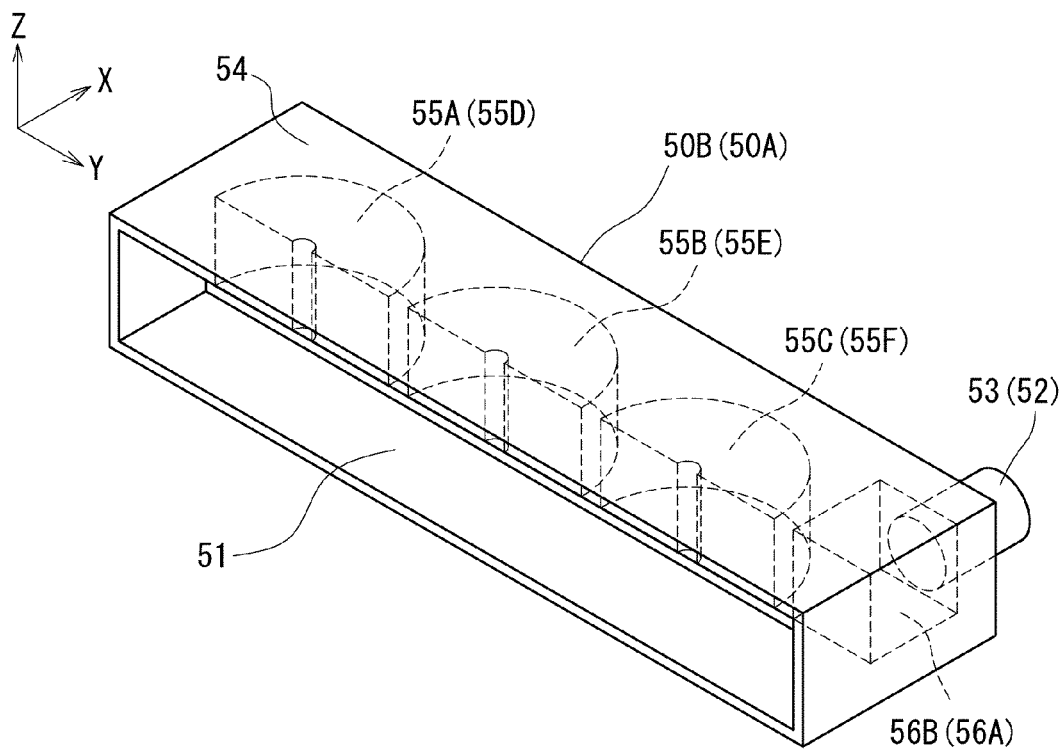
FIG. 14 is a perspective view of a lid in the second embodiment of the present invention.

Referring to FIGS. 13 and 14, a heat collector 1 according to a second embodiment differs from the heat collector 1 according to the first embodiment in the components described below. The other components in the second embodiment are the same as in the first embodiment. Like reference numerals denote the same or like components in the first embodiment.

Referring to FIG. 13, the body 10 has no connection holes 22A to 22F (refer to FIGS. 3 and 5). In other words, the body 10 is simply formed by extrusion molding.

Referring to FIGS. 5 and 14, the lid 50B is a rectangular prism elongated in Y-direction and includes the recessed portion 51 that is hollow and a base 54 that is solid. The base 54 includes connection channels 55A, 55B, and 55C. The connection channel 55A connects the second opening 19A and the second opening 19B and changes the flow direction of the heating medium by 180 degrees. In other words, the connection channel 55A connects the first flow channel 17A and the second flow channel 17B. Similarly, the connection channel 55B connects the second opening 19C and the second opening 19D, and the connection channel 55C connects the second opening 19E and the second opening 19F. In other words, the connection channel 55B connects the first flow channel 17C and the second flow channel 17D, and the connection channel 55C connects the first flow channel 17E and the second flow channel 17F. The base 54 also includes an inlet/outlet flow channel 56B. The inlet/outlet flow channel 56B connects the second opening 19G and the outlet 53.

Referring to FIGS. 3 and 14, the lid 50A is a rectangular prism elongated in Y-direction and includes the recessed portion 51 that is hollow and a base 54 that is solid. The base 54 includes connection channels 55D, 55E, and 55F. The connection channel 55D connects the first opening 18F and the first opening 18G and changes the flow direction of the heating medium by 180 degrees. In other words, the connection channel 55D connects the second flow channel 17F and the first flow channel 17G. Similarly, the connection channel 55E connects the first opening 18D and the first opening 18E, and the connection channel 55F connects the first opening 18B and the first opening 18C. In other words, the connection channel 55E connects the second flow channel 17D and the first flow channel 17E, and the connection channel 55F connects the second flow channel 17B and the first flow channel 17C. The base 54 includes an inlet/outlet flow channel 56A. The inlet/outlet flow channel 56A connects the first opening 18A and the inlet 52.

The heating medium entering through the inlet 52 enters the first flow channel 17A through the inlet/outlet flow channel 56A in the lid 50A, flows from the first end 15 toward the second end 16 through the first flow channel 17A, and enters the second flow channel 17B through the connection channel 55A in the lid 50B. The heating medium entering the second flow channel 17B flows from the second end 16 toward the first end 15 and enters the first flow channel 17C through the connection channel 55F in the lid 50A. In the same manner, the heating medium entering the first flow channel 17C flows through the first flow channels 17C, 17E, and 17G, the second flow channels 17D and 17F, the connection channels 55D and 55E in the lid 50A, and the connection channels 55B and 55C in the lid 50B, and exits the heat collector 1 from the outlet 53. In other words, the heating medium meanders from the inlet 52 toward the outlet 53 through the first flow channels 17A, 17C, 17E, and 17G, the second flow channels 17B, 17D, and 17F, the connection channels 55D to 55F in the lid 50A, and the connection channels 55A to 55C in the lid 50B.

In the heat collector 1 according to the second embodiment, the lids 50A and 50B are machined to form the connection channels 55A to 55F to create the meandering flow channels for the heating medium. The body 10 can thus be manufactured easily without machining to form the meandering flow channels.

Third Embodiment

Figure 15:
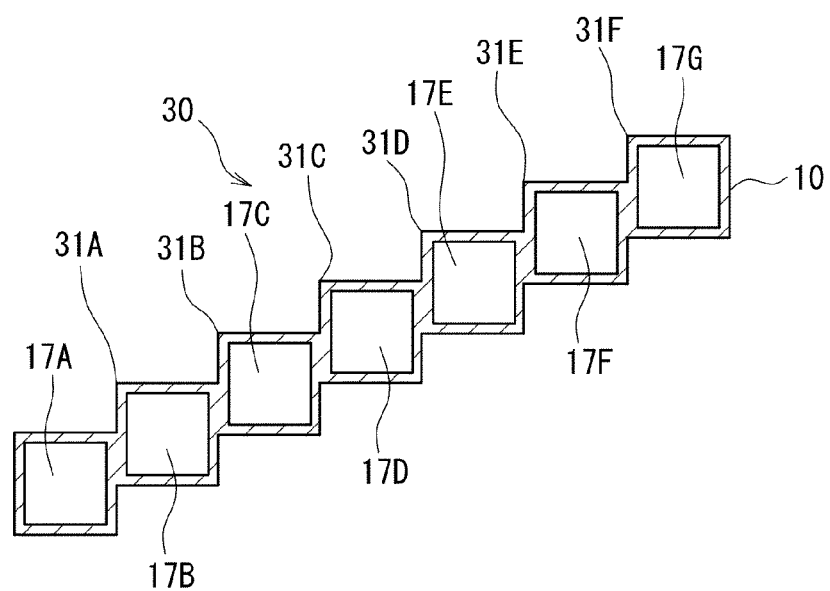
FIG. 15 is a sectional view similar to FIG. 6 in a third embodiment of the present invention.

Referring to FIG. 15, a heat collector 1 according to a third embodiment differs from the heat collector 1 according to the first embodiment in the components described below. The other components in the third embodiment are the same as in the first embodiment. Like reference numerals denote the same or like components in the first embodiment.

The body 10 in the third embodiment includes a stepped portion 30 in its cross section perpendicular to the extension direction of the body 10. More specifically, the body 10 includes a step 31A to cause the second flow channel 17B to be located one step higher than the first flow channel 17A. Similarly, the body 10 includes steps 31B to 31F.

The heat collector 1 according to the third embodiment has the area for receiving sunlight per installation area increased by the stepped portion 30 and thus has higher efficiency of heating the heating medium. The heat collector 1 can thus respond to decreased density of solar energy. This structure increases the area for receiving sunlight per area of a shadow casted by the heat collector 1, thus reducing the shadow area. The body 10 is an extruded product. Thus, the body 10 with the stepped portion 30 described above can be formed easily.

Fourth Embodiment

Figure 16:
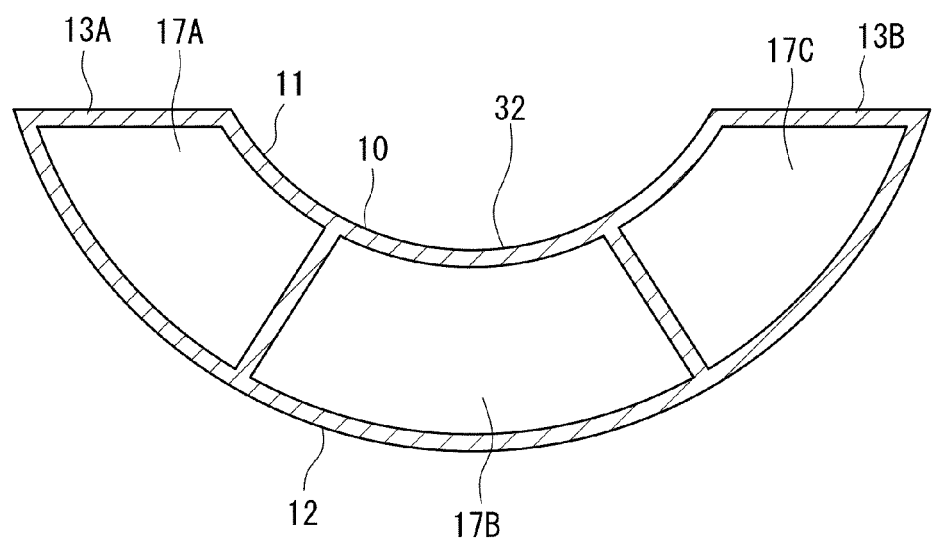
FIG. 16 is a sectional view similar to FIG. 6 in a fourth embodiment of the present invention.

Referring to FIG. 16, a heat collector 1 according to a fourth embodiment differs from the heat collector 1 according to the first embodiment in the components described below. The other components in the fourth embodiment are the same as in the first embodiment. Like reference numerals denote the same or like components in the first embodiment.

The body 10 in the fourth embodiment simply includes the first flow channels 17A and 17C and the second flow channel 17B. The body 10 includes a curved portion 32 in its cross section perpendicular to the extension direction of the body 10. More specifically, the body 10 includes the upper wall 11 convexly curved toward the lower wall 12 and the lower wall 12 concavely curved toward the upper wall 11.

The heat collector 1 according to the fourth embodiment includes the curved portion 32 that increases the area for receiving sunlight, thus increasing the efficiency of heating the heating medium. The heat collector 1 can thus respond to decreased density of solar energy. This structure increases the area for receiving sunlight per area of a shadow casted by the heat collector 1, thus reducing the shadow area. The body 10 is an extruded product. Thus, the body 10 including the curved portion 32 described above can be formed easily.

Fifth Embodiment

Figure 17:
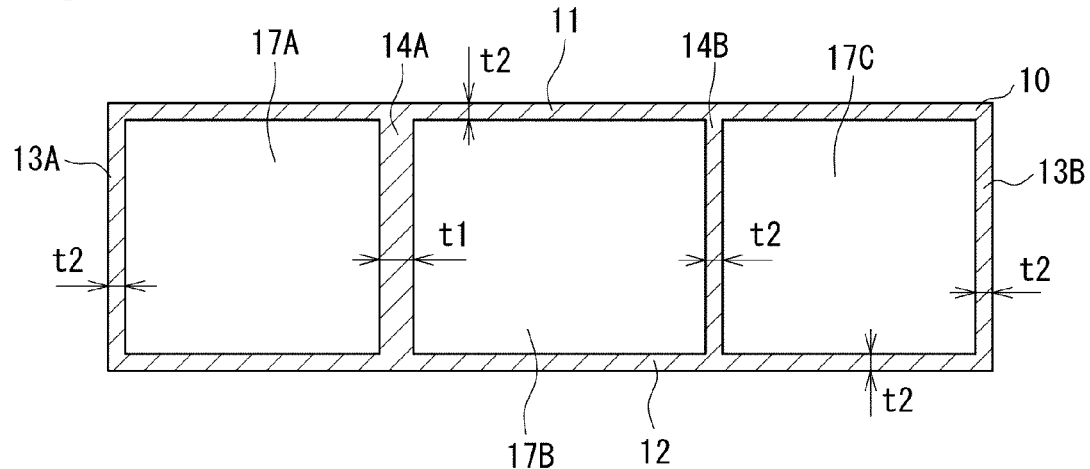
FIG. 17 is a sectional view similar to FIG. 6 in a fifth embodiment of the present invention.

Referring to FIG. 17, a heat collector 1 according to a fifth embodiment differs from the heat collector 1 according to the first embodiment in the components described below. The other components in the fifth embodiment are the same as in the first embodiment. Like reference numerals denote the same or like components in the first embodiment.

The body 10 in the fifth embodiment simply includes the first flow channels 17A and 17C and the second flow channel 17B.

In the body 10 in the fifth embodiment, the partition wall 14A separating the first flow channel 17A and the second flow channel 17B has a thickness t1 greater than a thickness t2 of the partition wall 14B separating the second flow channel 17B and the first flow channel 17C, the upper wall 11, the lower wall 12, and the side walls 13A and 13B.

The heat collector 1 according to the fifth embodiment has less heat exchange between the first flow channel 17A and the second flow channel 17B that are adjacent to each other. This reduces heat transfer from the heating medium flowing through the second flow channel 17B to the heating medium flowing through the first flow channel 17A, thus maintaining the high temperature of the heating medium in the second flow channel 17B.

Figure 18:
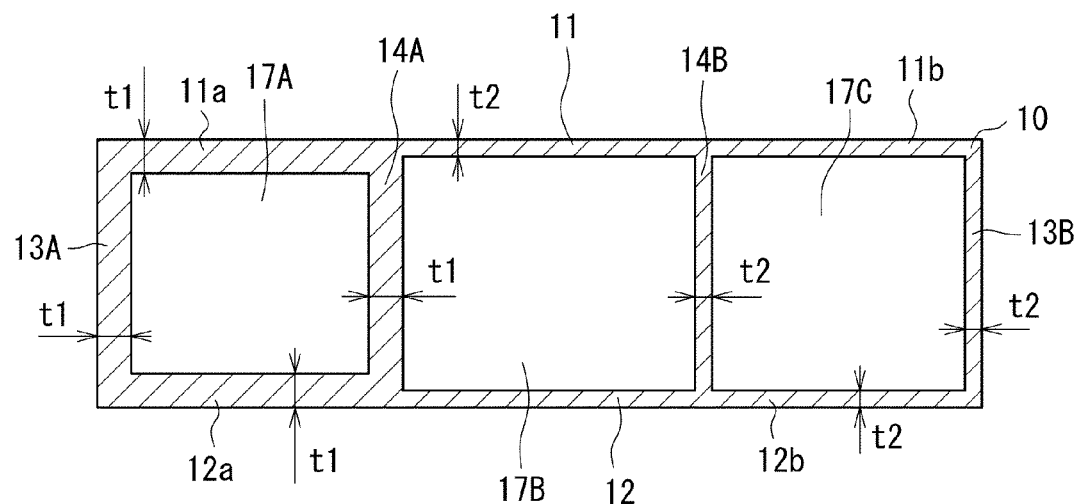
FIG. 18 is a sectional view similar to FIG. 6 in a modification of the fifth embodiment of the present invention.

Referring to FIG. 18, in the body 10 in a modification of the fifth embodiment, the portions defining the first flow channel 17A have a thickness t1 greater than a thickness t2 of the other portions. More specifically, a first upper wall portion 11a of the upper wall 11 defining the first flow channel 17A has the thickness t1 greater than the thickness t2 of a second upper wall portion 11b of the upper wall 11 defining the second flow channel 17B and the first flow channel 17C. A first lower wall portion 12a of the lower wall 12 defining the first flow channel 17A has the thickness t1 greater than the thickness t2 of a second lower wall portion 12b of the lower wall 12 defining the second flow channel 17B and the first flow channel 17C. The side wall 13A defining the first flow channel 17A has the thickness t1 greater than the thickness t2 of the side wall 13B. The partition wall 14A defining the first flow channel 17A has the thickness t1 greater than the thickness t2 of the partition wall 14B.

A heat collector 1 according to the modification has less heat exchange between the first flow channel 17A and the second flow channel 17B and thus has higher heating efficiency in the first flow channel 17A. The first upper wall portion 11a, the side wall 13A, the first lower wall portion 12a, and the partition wall 14A defining the first flow channel 17A are thick and retain a large amount of heat. This structure can have higher heating efficiency in the first flow channel 17A than in the second flow channel 17B and the first flow channel 17C.

Sixth Embodiment

Figure 19:
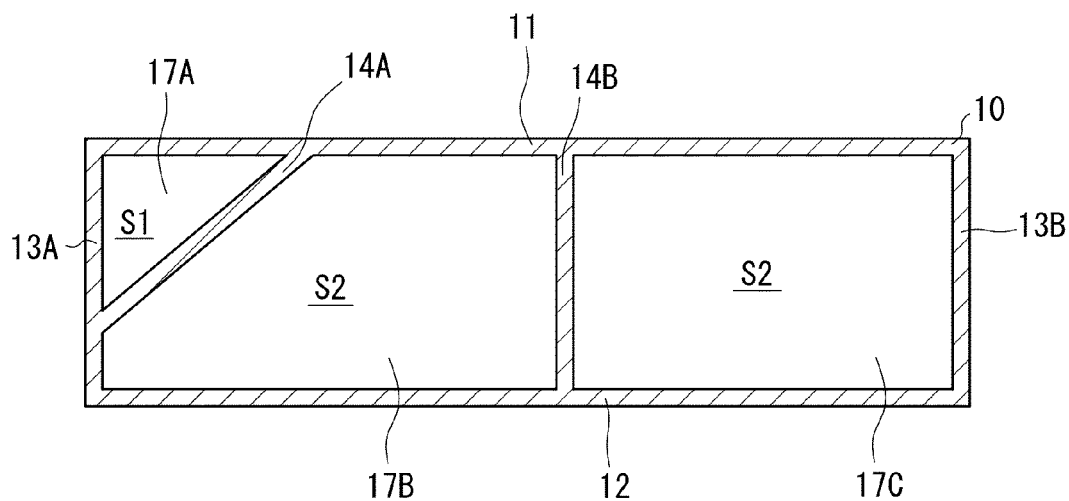
FIG. 19 is a sectional view similar to FIG. 6 in a sixth embodiment of the present invention.

Referring to FIG. 19, a heat collector 1 according to a sixth embodiment differs from the heat collector 1 according to the first embodiment in the components described below. The other components in the sixth embodiment are the same as in the first embodiment. Like reference numerals denote the same or like components in the first embodiment.

The body 10 in the sixth embodiment simply includes the first flow channels 17A and 17C and the second flow channel 17B.

In the body 10 in the sixth embodiment, the partition wall 14A separating the first flow channel 17A and the second flow channel 17B connects the upper wall 11 and the side wall 13A. The area of the first flow channel 17A in its cross section perpendicular to the extension direction, or in other words, a flow channel cross-sectional area S1, is smaller than the area of each of the second flow channel 17B and the first flow channel 17C in their cross sections perpendicular to the extension direction, or in other words, flow channel cross-sectional area S2. In other words, the flow channel cross-sectional area S1 of the first flow channel 17A aligned with the inlet 52 (refer to FIG. 1) is smaller than the flow channel cross-sectional area S2 of the second flow channel 17B. In the sixth embodiment, the areas of the second flow channel 17B and the first flow channel 17C in their cross sections perpendicular to the extension direction are equal to each other.

In the heat collector 1 according to the sixth embodiment, the heating medium undergoes a pressure drop in the first flow channel 17A aligned with the inlet 52 and thus decelerates, thus having a longer time of contact with the body 10. This increases the efficiency of heating the heating medium.

Seventh Embodiment

Figure 20:
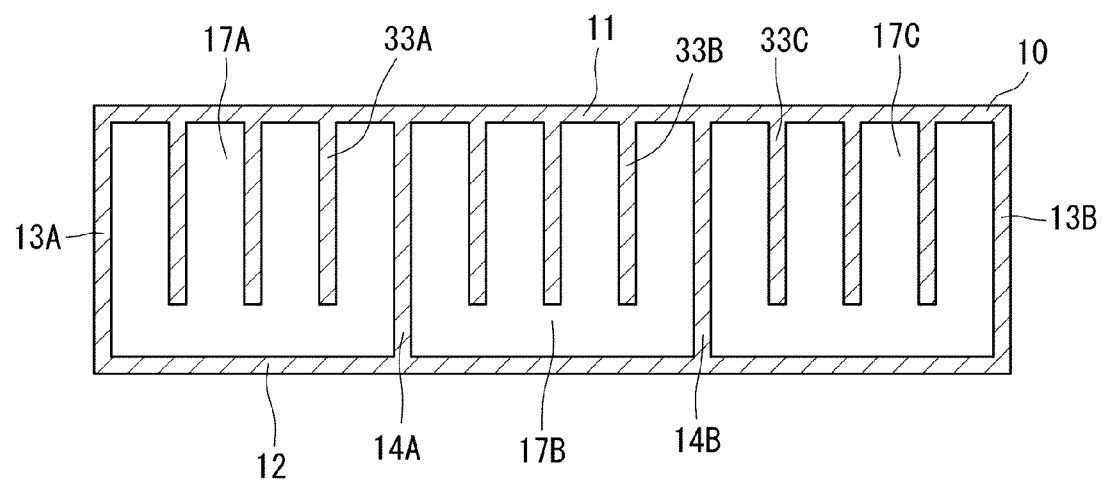
FIG. 20 is a sectional view similar to FIG. 6 in a seventh embodiment of the present invention.

Referring to FIG. 20, a heat collector 1 according to a seventh embodiment differs from the heat collector 1 according to the first embodiment in the components described below. The other components in the seventh embodiment are the same as in the first embodiment. Like reference numerals denote the same or like components in the first embodiment.

The body 10 in the seventh embodiment simply includes the first flow channels 17A and 17C and the second flow channel 17B.

The body 10 includes, on the upper wall 11, multiple ribs (first ribs) 33A spaced from one another and protruding toward the first flow channel 17A. Each rib 33A extends from the first end 15 (refer to FIG. 2) to the second end 16 (refer to FIG. 2) in the extension direction of the body 10. Similarly, the body 10 includes ribs (first ribs) 33B in the second flow channel 17B and ribs (first ribs) 33C in the first flow channel 17C. The ribs 33A to 33C are formed integrally with the body 10 by extrusion molding.

The heat collector 1 according to the seventh embodiment includes the ribs 33A to 33C and thus has a larger area of contact between the body 10 and the heating medium. This allows heat converted from sunlight received by the body 10 to be efficiently transferred to and stored into the heating medium. The heat collector 1 can thus respond to decreased density of solar energy. The body 10 is an extruded product. Thus, the body 10 including the ribs 33A to 33C can be formed easily.

Figure 21:
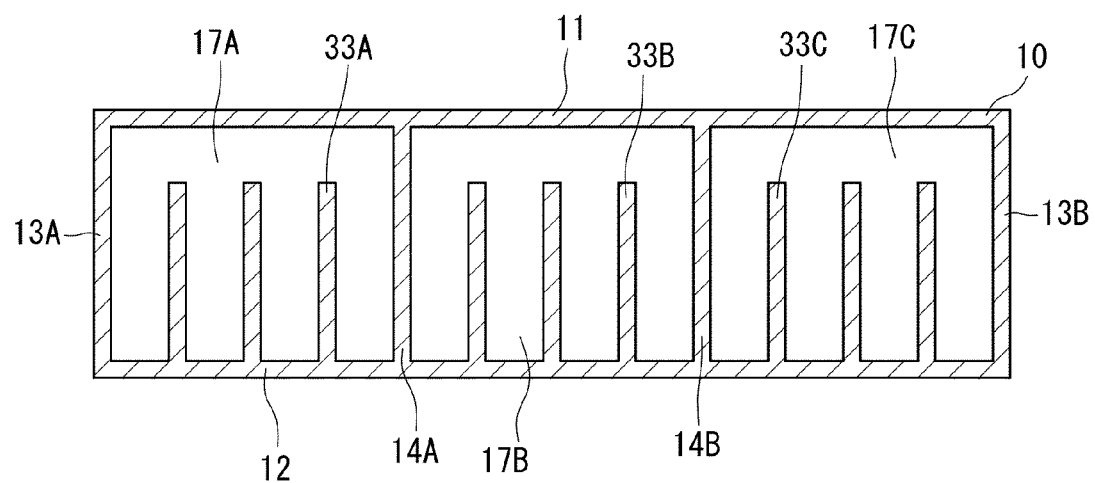
FIG. 21 is a sectional view similar to FIG. 6 in a modification of the seventh embodiment of the present invention.
Figure 22:
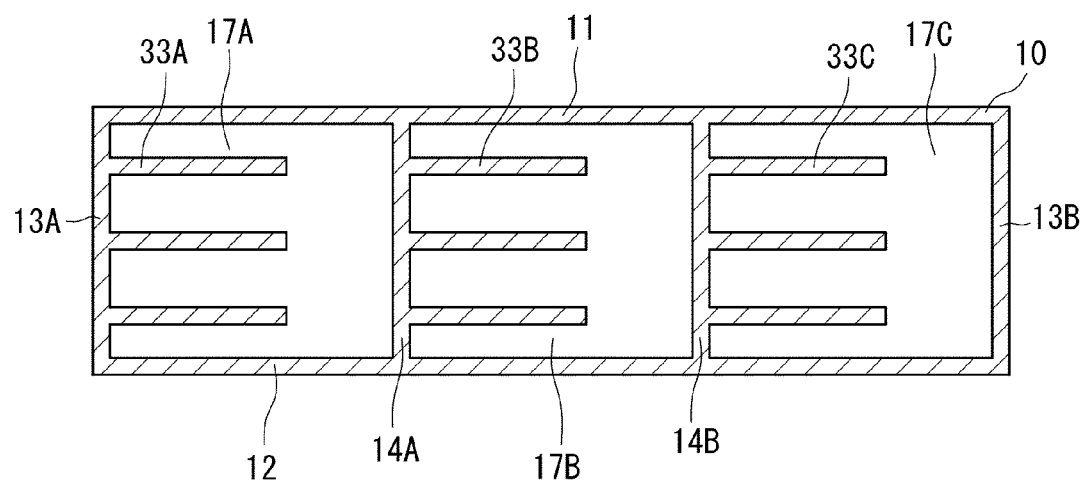
FIG. 22 is a sectional view similar to FIG. 6 in a modification of the seventh embodiment of the present invention.
Figure 23:
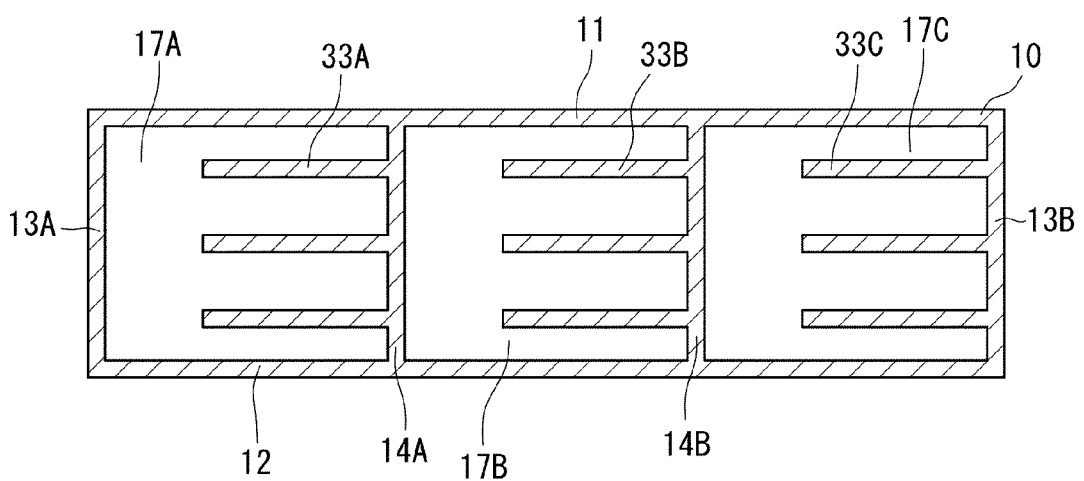
FIG. 23 is a sectional view similar to FIG. 6 in a modification of the seventh embodiment of the present invention.

FIGS. 21 to 23 are each a sectional view of the body 10 in modifications of the seventh embodiment.

Referring to FIG. 21, the body 10 includes, on the lower wall 12, multiple ribs 33A spaced from one another and protruding toward the first flow channel 17A. Each rib 33A extends from the first end 15 (refer to FIG. 2) to the second end 16 (refer to FIG. 2) in the extension direction of the body 10. Similarly, the body 10 includes ribs 33B in the second flow channel 17B and ribs 33C in the first flow channel 17C.

Referring to FIG. 22, the body 10 includes, on the side wall 13A, multiple ribs 33A spaced from one another and protruding toward the first flow channel 17A. Each rib 33A extends from the first end 15 (refer to FIG. 2) to the second end 16 (refer to FIG. 2) in the extension direction of the body 10. The body 10 includes, on the partition wall 14A, multiple ribs 33B spaced from one another and protruding toward the second flow channel 17B. Each rib 33B extends from the first end 15 (refer to FIG. 2) to the second end 16 (refer to FIG. 2) in the extension direction of the body 10. Similarly, the body 10 includes ribs 33C on the partition wall 14B in the first flow channel 17C.

Referring to FIG. 23, the body 10 includes, on the partition wall 14A, multiple ribs 33A spaced from one another and protruding toward the first flow channel 17A. Each rib 33A extends from the first end 15 (refer to FIG. 2) to the second end 16 (refer to FIG. 2) in the extension direction of the body 10. Similarly, the body 10 includes ribs 33B on the partition wall 14B in the second flow channel 17B. The body 10 includes, on the side wall 13B, multiple ribs 33C spaced from one another and protruding toward the first flow channel 17C. Each rib 33C extends from the first end 15 (refer to FIG. 2) to the second end 16 (refer to FIG. 2) in the extension direction of the body 10.

Eighth Embodiment

Figure 24:
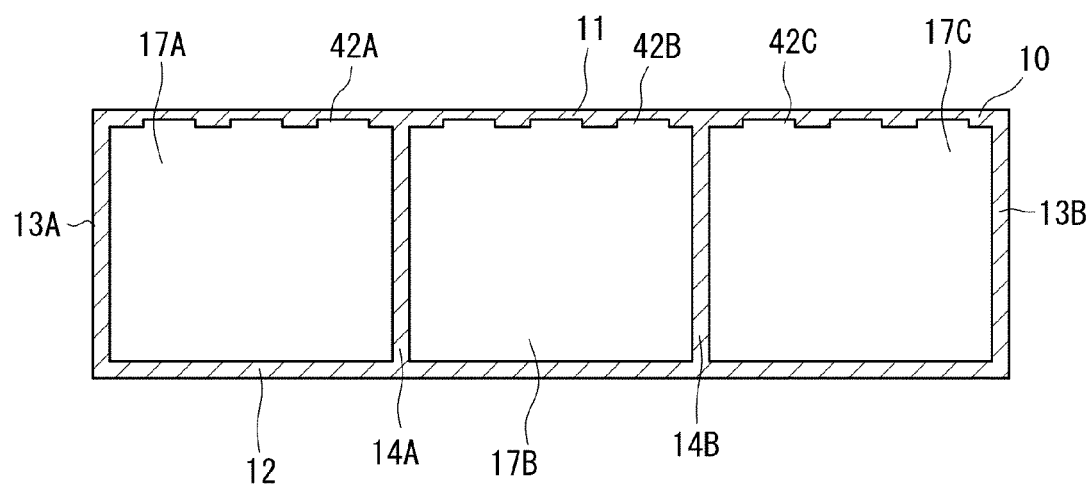
FIG. 24 is a sectional view similar to FIG. 6 in an eighth embodiment of the present invention.

Referring to FIG. 24, a heat collector 1 according to an eighth embodiment differs from the heat collector 1 according to the first embodiment in the components described below. The other components in the eighth embodiment are the same as in the first embodiment. Like reference numerals denote the same or like components in the first embodiment.

The body 10 in the eighth embodiment simply includes the first flow channels 17A and 17C and the second flow channel 17B.

The body 10 has, on the upper wall 11, multiple recesses (first recesses) 42A spaced from one another and facing the first flow channel 17A. Each recess 42A extends from the first end 15 (refer to FIG. 2) to the second end 16 (refer to FIG. 2) in the extension direction of the body 10. Similarly, the body 10 has recesses (first recesses) 42B in the second flow channel 17B and recesses (first recesses) 42C in the first flow channel 17C. The recesses 42A to 42C are formed integrally with the body 10 by extrusion molding. The recesses 42A to 42C may be on the lower wall 12 or the side walls 13A and 13B, or may be on all the upper wall 11, the lower wall 12, and the side walls 13A and 13B.

In the eighth embodiment, the recesses 42A to 42C increase the area of contact between the body 10 and the heating medium. This allows heat converted from sunlight received by the body 10 to be efficiently transferred to and stored into the heating medium. The heat collector 1 can thus respond to decreased density of solar energy. The body 10 is an extruded product. The recesses 42A to 42C can thus be formed easily.

Ninth Embodiment

Figure 25:
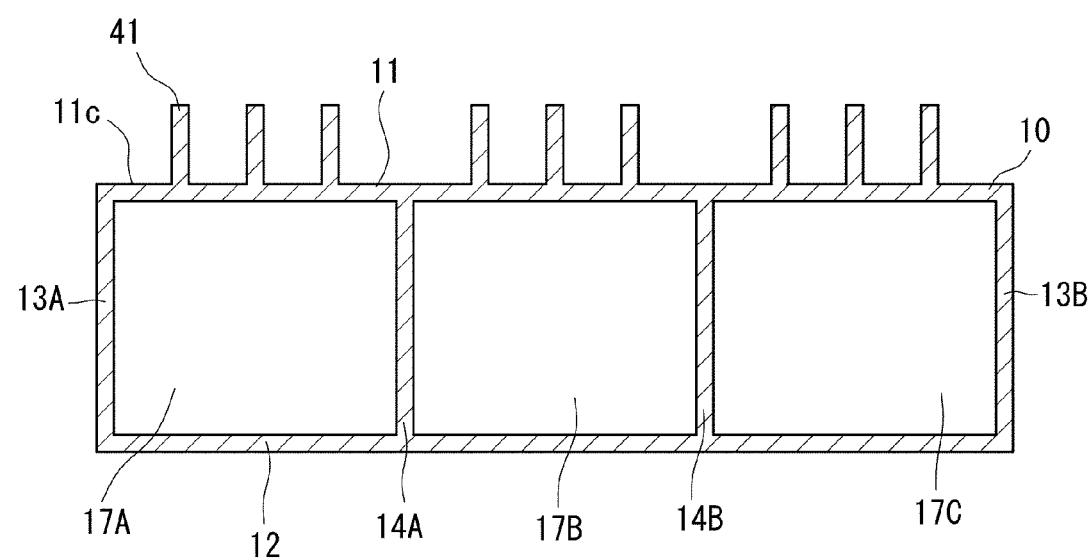
FIG. 25 is a sectional view similar to FIG. 6 in a ninth embodiment of the present invention.

Referring to FIG. 25, a heat collector 1 according to a ninth embodiment differs from the heat collector 1 according to the first embodiment in the components described below. The other components in the ninth embodiment are the same as in the first embodiment. Like reference numerals denote the same or like components in the first embodiment.

The body 10 in the ninth embodiment simply includes the first flow channels 17A and 17C and the second flow channel 17B.

The body 10 includes, on the upper surface 11c, multiple ribs (second ribs) 41 spaced from one another and protruding outward from the body 10. Each rib 41 extends from the first end 15 (refer to FIG. 2) to the second end 16 (refer to FIG. 2) in the extension direction of the body 10. The ribs 41 are formed integrally with the body 10 by extrusion molding.

The heat collector 1 according to the ninth embodiment includes the ribs 41 and thus has a larger area for receiving sunlight on the body 10. In other words, the heating medium can be heated by sunlight received by the ribs 41, in addition to sunlight received on the upper surface 11c. This increases the efficiency of heating the heating medium. The heat collector 1 can thus respond to decreased density of solar energy.

Tenth Embodiment

Figure 26:
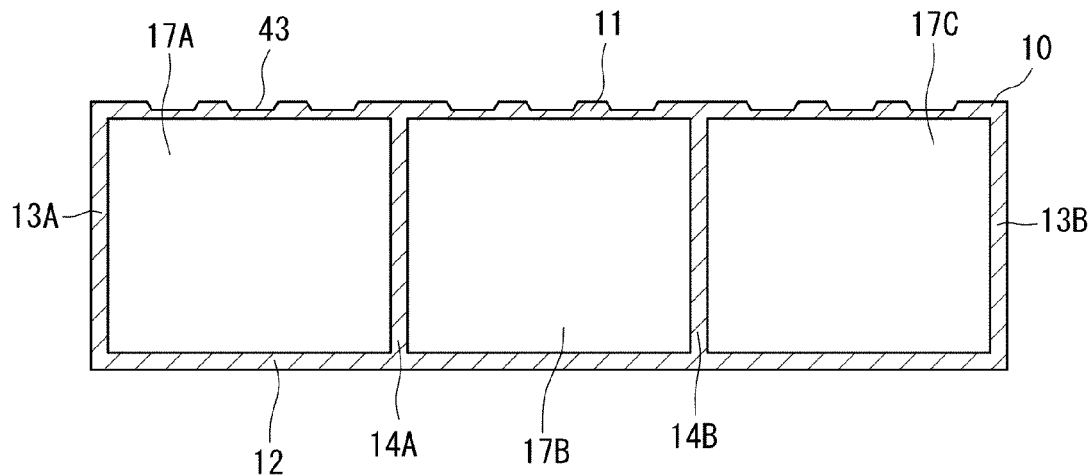
FIG. 26 is a sectional view similar to FIG. 6 in a tenth embodiment of the present invention.

Referring to FIG. 26, a heat collector 1 according to a tenth embodiment differs from the heat collector 1 according to the first embodiment in the components described below. The other components in the tenth embodiment are the same as in the first embodiment. Like reference numerals denote the same or like components in the first embodiment.

The body 10 in the tenth embodiment simply includes the first flow channels 17A and 17C and the second flow channel 17B.

The body 10 has, on the upper surface 11c, multiple recesses (second recesses) 43 spaced from one another and facing the outside of the body 10. Each recess 43 extends from the first end 15 (refer to FIG. 2) to the second end 16 (refer to FIG. 2) in the extension direction of the body 10. The recesses 43 are formed integrally with the body 10 by extrusion molding.

In the tenth embodiment, the recesses 43 increase the area for receiving sunlight on the body 10. In other words, the heating medium can be heated by sunlight received by the recesses 43, in addition to sunlight received on the upper surface 11c. This increases the efficiency of heating the heating medium. The heat collector 1 can thus respond to decreased density of solar energy. The body 10 is an extruded product. The recesses 43 can thus be formed easily.

In the tenth embodiment, each recess 43 slopes and is recessed, thus increasing the area for receiving sunlight.

Eleventh Embodiment

Figure 27:
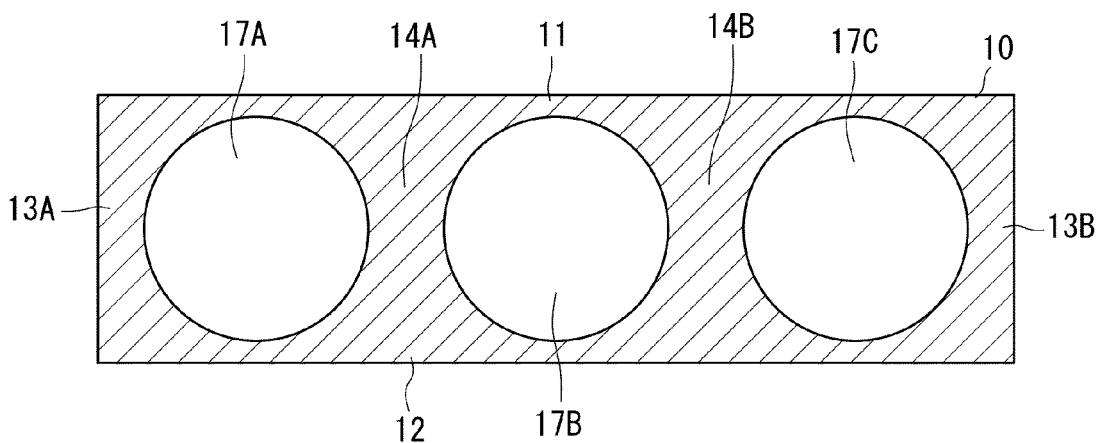
FIG. 27 is a sectional view similar to FIG. 6 in an eleventh embodiment of the present invention.
Figure 28:
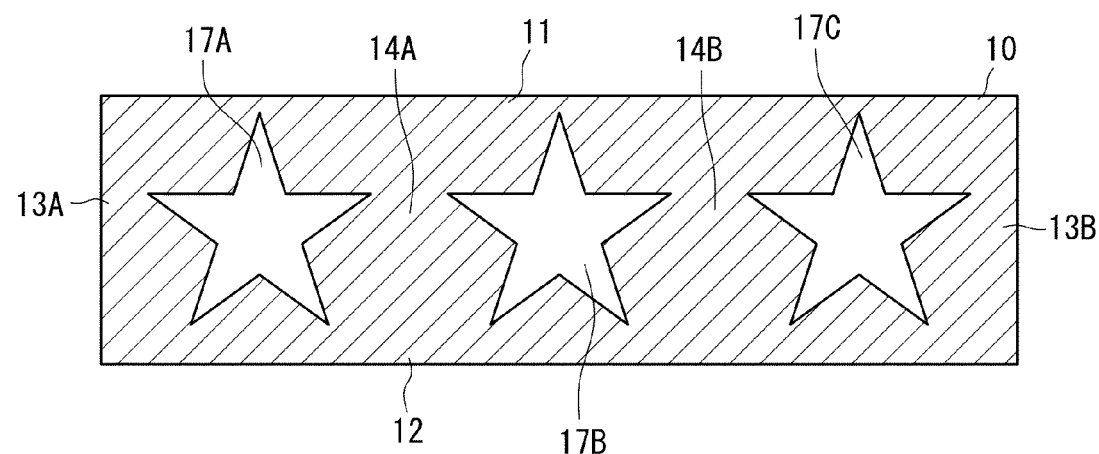
FIG. 28 is a sectional view similar to FIG. 6 in a modification of the eleventh embodiment of the present invention.

Referring to FIGS. 27 and 28, a heat collector 1 according to an eleventh embodiment differs from the heat collector 1 according to the first embodiment in the components described below. The other components in the eleventh embodiment are the same as in the first embodiment. Like reference numerals denote the same or like components in the first embodiment.

Referring to FIG. 27, the body 10 in the eleventh embodiment simply includes the first flow channels 17A and 17C and the second flow channel 17B. The first flow channels 17A and 17C and the second flow channel 17B each have a circular cross section perpendicular to the extension direction.

The heat collector 1 according to the eleventh embodiment has a higher proportion of a metal portion to the volume of the body 10. This increases the amount of heat retained in the metal portion, thus increasing the efficiency of heating the heating medium. The first flow channels 17A and 17C and the second flow channel 17B each have a circular cross section to reduce air remaining in the channels. This increases the area of contact between the body 10 and the heating medium, thus increasing the efficiency of heating the heating medium.

Referring to FIG. 28, the first flow channels 17A and 17C and the second flow channel 17B each have a star-shaped cross section perpendicular to the extension direction in a modification of the eleventh embodiment.

A heat collector 1 according to the modification of the eleventh embodiment has a higher proportion of a metal portion to the volume of the body 10. This increases the amount of heat retained in the metal portion, thus increasing the efficiency of heating the heating medium. The star-shaped cross section increases the area of contact between the body 10 and the heating medium, thus increasing the efficiency of heating the heating medium.

Twelfth Embodiment

Figure 29:
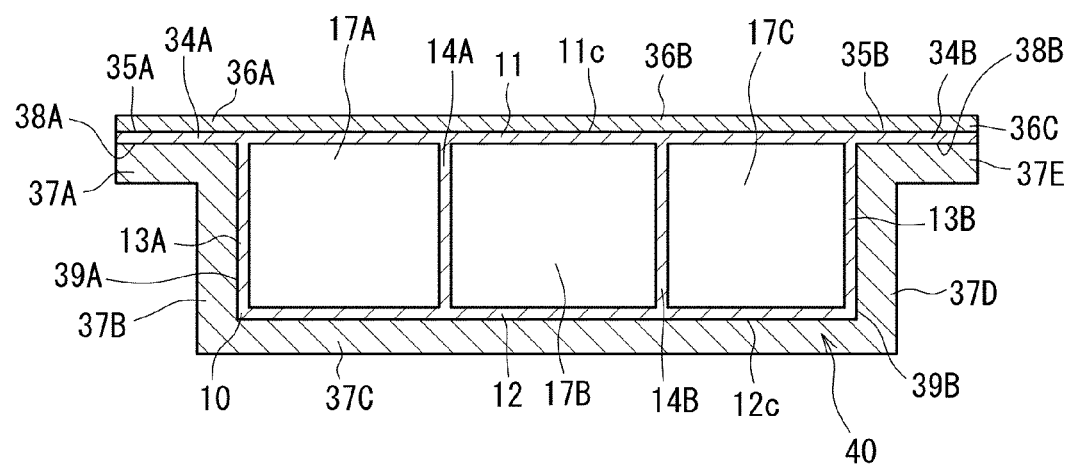
FIG. 29 is a sectional view similar to FIG. 6 in a twelfth embodiment of the present invention.

Referring to FIG. 29, a heat collector 1 according to a twelfth embodiment differs from the heat collector 1 according to the first embodiment in the components described below. The other components in the twelfth embodiment are the same as in the first embodiment. Like reference numerals denote the same or like components in the first embodiment.

The body 10 in the twelfth embodiment simply includes the first flow channels 17A and 17C and the second flow channel 17B.

The upper wall 11 in the twelfth embodiment includes flanges 34A and 34B protruding from the upper wall 11 beyond the pair of side walls 13A and 13B, or in other words, extending from two ends of the upper wall 11 in Y-direction. The flange 34A has an upper surface (light-receiving surface) 35A facing the sun. The flange 34B has an upper surface (light-receiving surface) 35B facing the sun. In the twelfth embodiment, the upper surfaces 35A and 35B are flush with the upper surface 11c. In the twelfth embodiment, the flanges 34A and 34B are formed integrally with the upper wall 11 by extrusion molding. In some embodiments, the flanges 34A and 34B may be formed separately and integrated with the upper wall 11 by, for example, welding.

The upper surfaces 35A and 35B and the upper surface 11c are coated with black films 36A, 36B, and 36C. The black films 36A to 36C are, for example, films with high emissivity formed using electrolysis of an aluminum alloy. The black films 36A to 36C absorb light with substantially all wavelengths of sunlight.

The heat collector 1 according to the twelfth embodiment includes heat insulators 37A, 37B, 37C, 37D, and 37E on an outer surface 40 of the body 10 except the upper surfaces 35A and 35B and the upper surface 11c. In the twelfth embodiment, the outer surface 40 of the body 10 includes the upper surfaces 35A and 35B, the upper surface 11c, a lower surface 38A of the flange 34A, an outer surface 39A of the side wall 13A, a lower surface 12c of the lower wall 12, an outer surface 39B of the side wall 13B, and a lower surface 38B of the flange 34B. The heat insulator 37A is in contact with the lower surface 38A. The heat insulator 37B is in contact with the outer surface 39A. The heat insulator 37C is in contact with the lower surface 12c. The heat insulator 37D is in contact with the outer surface 39B. The heat insulator 37E is in contact with the lower surface 38B.

The heat collector 1 according to the twelfth embodiment has a higher emissivity on the upper surfaces 35A and 35B and the upper surface 11c, thus increasing the efficiency of heating the heating medium with sunlight.

The upper surfaces 35A and 35B increase the area for receiving sunlight, thus increasing the efficiency of heating the heating medium.

The heat insulators 37A to 37E reduce or prevent the release of heat from the heated heating medium or the body 10 to, for example, the atmosphere. This increases the efficiency of heating the heating medium.

Thirteenth Embodiment

Figure 30:
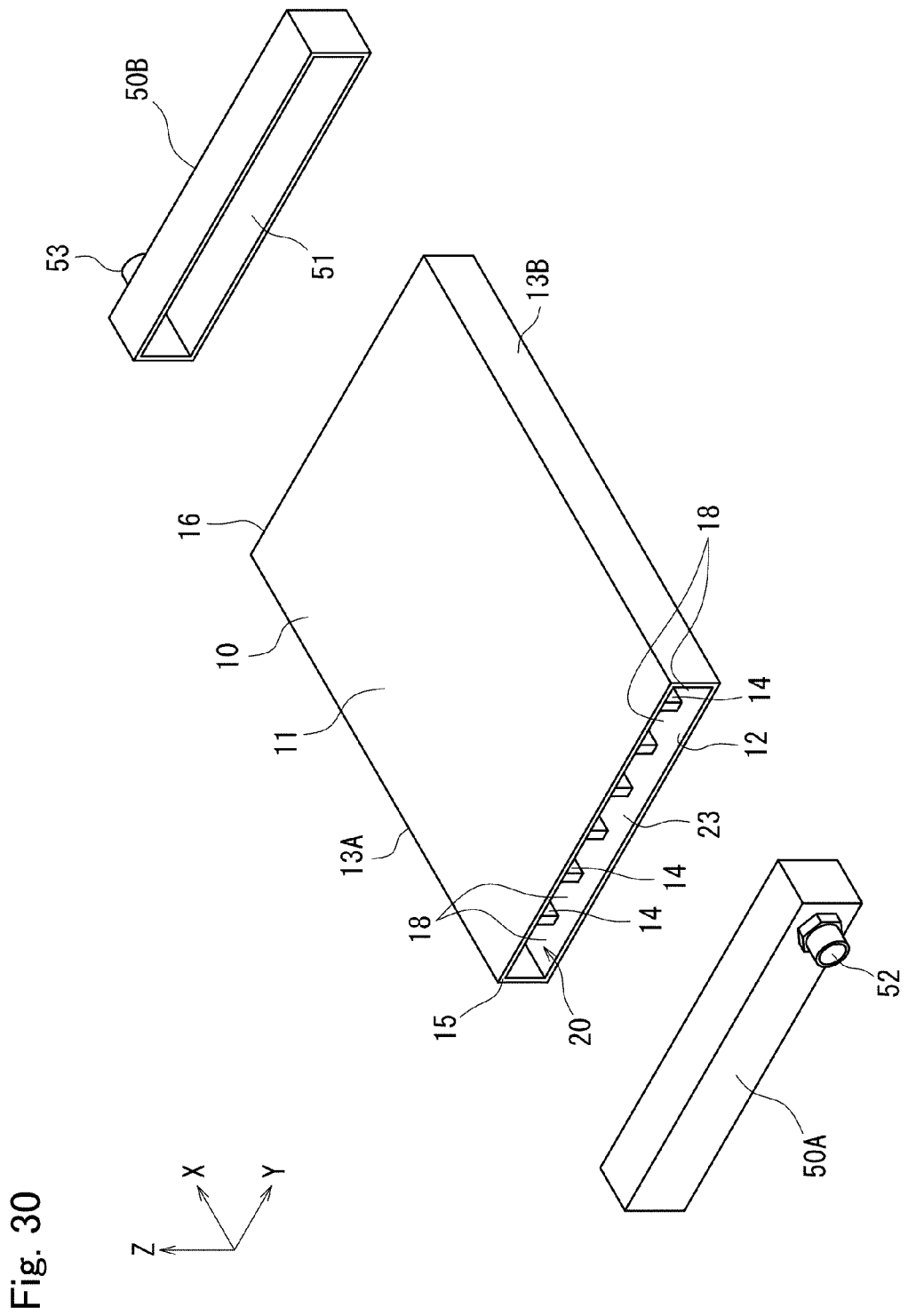
FIG. 30 is an exploded perspective view of a heat collector according to a thirteenth embodiment of the present invention.
Figure 31:
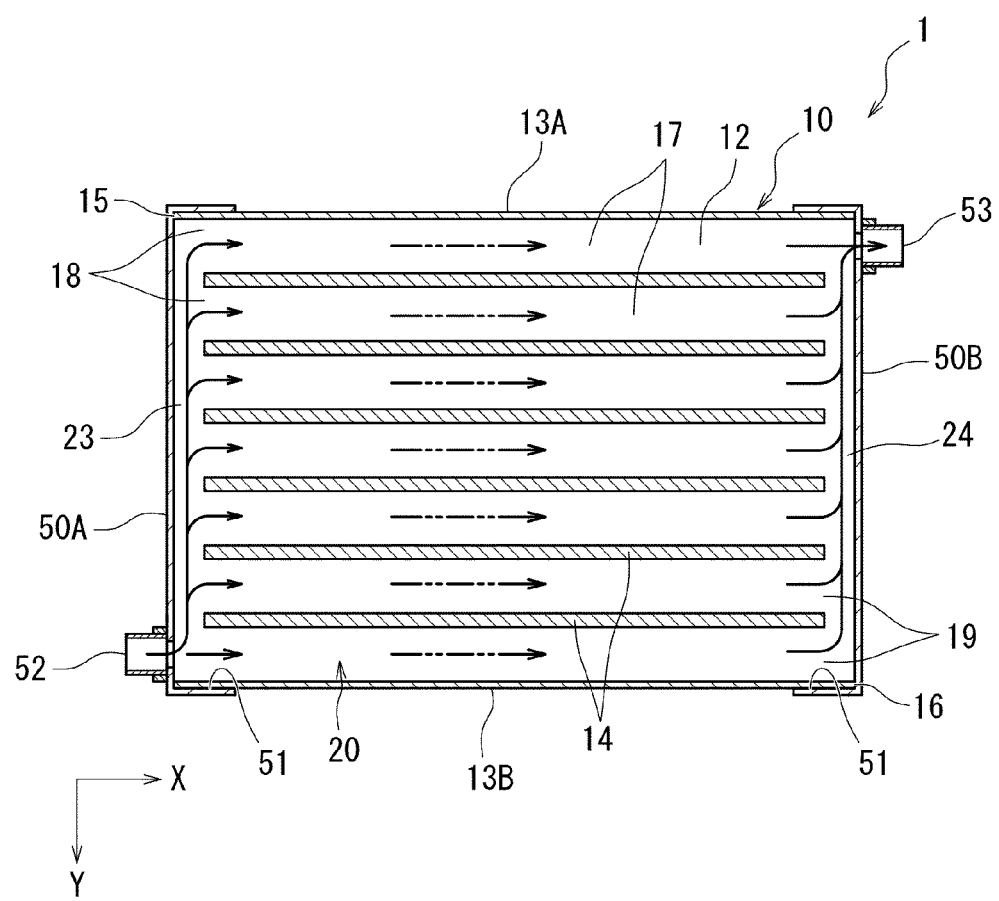
FIG. 31 is a sectional view of the heat collector according to the thirteenth embodiment of the present invention.

Referring to FIGS. 30 and 31, a heat collector 1 according to a thirteenth embodiment differs from the heat collector 1 according to the first embodiment in the components described below. The other components in the thirteenth embodiment are the same as in the first embodiment. Like reference numerals denote the same or like components in the first embodiment.

The body 10 has the upper wall 11, the lower wall 12, and the pair of side walls 13A and 13B. The body 10 is substantially a panel, or in other words, an elongated rectangular prism with a low height. The upper wall 11 and the lower wall 12 are rectangular in a plan view. The pair of side walls 13A and 13B connect the long sides of the upper wall 11 and the lower wall 12 in the vertical direction and extend in a longitudinal direction (X-direction). The body 10 includes the hollow portion 20 as an internal space defined by the four walls 11, 12, 13A, and 13B. The hollow portion 20 is open at its two longitudinal ends (the first end 15 and the second end 16). In other words, the body 10 has, at its two longitudinal ends, a pair of rectangular openings defined by the edges of the four walls 11, 12, 13A, and 13B.

The hollow portion 20 is partitioned by the multiple partition walls 14. The partition walls 14 are arranged at intervals in a short-side direction (Y-direction) and extend in the longitudinal direction. Each partition wall 14 has an upper end connected to the inner surface of the upper wall 11 and a lower end connected to the inner surface of the lower wall 12. The hollow portion 20 is partitioned into multiple elongated holes aligned in the short-side direction. Each elongated hole extends parallel to the longitudinal direction of the body 10 from the first end 15 to the second end 16. In the present embodiment, the partition walls 14 are arranged at equal intervals. The upper wall 11 and the lower wall 12 have a constant distance between them in the vertical direction across the body 10. The elongated holes have rectangular cross sections having areas equal to one another. Although six partition walls 14 and seven elongated holes, greater in number by one, are shown in the illustrated example, the structure may include any number of multiple elongated holes.

Each elongated hole has a first opening 18 that is open at the first end 15 and a second opening 19 that is open at the second end 16. Each partition wall 14 has two ends positioned in the internal space defined by the four walls 11, 12, 13A, and 13B. The first opening 18 and the second opening 19 in each elongated hole are thus also in the internal space.

The body 10 has a first recess 23 adjacent to the first end 15 and a second recess 24 adjacent to the second end 16. The first recess 23 connects one opening in the body 10 with the multiple first openings 18. The second recess 24 connects the other opening in the body 10 with the multiple second openings 19.

The first end 15 is fluid-tightly received in the recessed portion 51 in the lid 50A. The second end 16 is fluid-tightly received in the recessed portion 51 in the lid 50B. This forms the heat collector 1. The heating medium entering through the inlet 52 enters the multiple elongated holes through the first recess 23 and the multiple first openings 18. The heating medium flows from the first end 15 toward the second end 16 through the multiple elongated holes. In other words, the elongated holes each serve as the first flow channel 17 through which the heating medium flows from the first end 15 toward the second end 16. The heating medium flowing through each first flow channel 17 merges at the second recess 24 through the corresponding second opening 19. The heating medium in the second recess 24 exits through the outlet 53.

Unlike in the first embodiment in which the heating medium meanders, in the present embodiment, the heat collector 1 includes no second flow channel (e.g., the flow channels 17B, 17D, and 17F shown in FIG. 3) through which the heating medium flows from the second end 16 with the outlet 53 toward the first end 15 with the inlet 52. The hollow portion 20 in the heat collector 1 includes the multiple first flow channels 17 connected in parallel to the first recess 23 and the second recess 24. The heating medium from the first recess 23 enters the first flow channels 17, flows from the first end 15 toward the second end 16 in one direction, and merges at the second recess 24.

After the pump 79 is started, the heating medium starts flowing through the multiple first flow channels 17 sequentially from the first flow channel 17 nearest the inlet 52. The heating medium thus has a temperature gradient in the multiple first flow channels 17 with the temperature higher in the flow channels nearer the inlet 52 and lower in the flow channels farther from the inlet 52.

In the present embodiment as well, the heat collector 1 has a simplified structure. Additionally, with the multiple first flow channels 17 connected in parallel, the heating medium flows in one direction through the heat collector 1, thus easily having an increased flow rate. The heating medium with an increased flow rate may be used to lower the temperature of the greenhouse when the temperature rises high. The heat collector 1 is thus usable as an auxiliary device for a cooling system as well. The residence time of heating medium is shorter, thus reducing a load on the pump 79.

Fourteenth Embodiment

Figure 32:
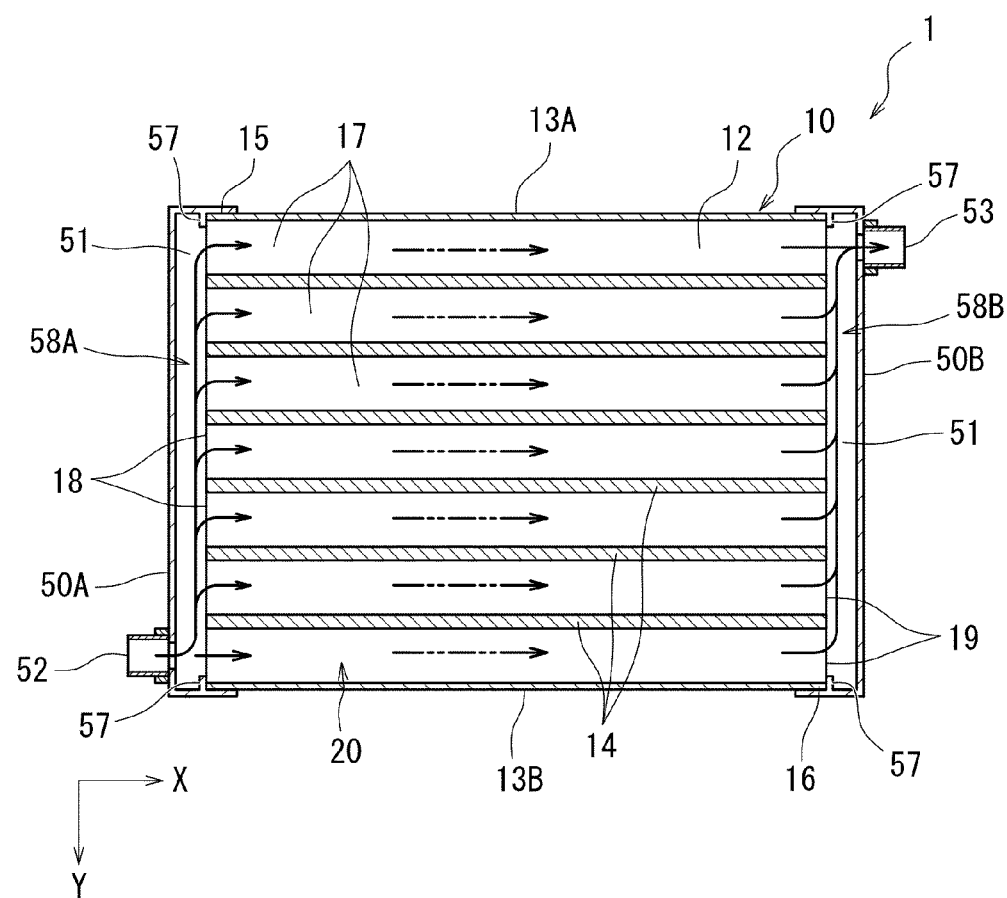
FIG. 32 is a sectional view of a heat collector according to a fourteenth embodiment of the present invention.

Referring to FIG. 32, a heat collector 1 according to a fourteenth embodiment differs from the heat collector 1 according to the first embodiment in the components described below. The other components in the fourteenth embodiment are the same as in the first embodiment. Like reference numerals denote the same or like components in the first embodiment.

Unlike in the thirteenth embodiment, the partition walls 14 each have two longitudinal ends substantially aligned with the longitudinal edges of the body 10. The pair of lids 50A and 50B include stoppers 57 each protruding into the recessed portion 51. The first end 15 being received in the recessed portion 51 comes in contact with the stoppers 57 before reaching the inner bottom surface of the recessed portion 51, and is restricted from moving in the longitudinal direction. The same applies to the second end 16. This forms, in the pair of lids 50A and 50B, common channels 58A and 58B outward from the stoppers 57 (nearer the inner bottom surfaces of the recessed portions 51). The common channels 58A and 58B connect with the multiple first flow channels 17. The common channel 58A in the lid 50A connects with the inlet 52. The common channel 58B in the lid 50B connects with the outlet 53.

In the present embodiment as well, the heating medium enters the common channel 58A through the inlet 52, enters the multiple first flow channels 17 through the common channel 58A, merges at the common channel 58B, and exits the heat collector 1 through the outlet 53 as in the thirteenth embodiment. This structure produces the same advantageous effects as in the thirteenth embodiment.

Fifteenth Embodiment

Referring to FIGS. 33 to 36B, a heat collector 1 according to a fifteenth embodiment differs from the heat collector 1 according to the first embodiment in the components described below. The other components in the fifteenth embodiment are the same as in the first embodiment. Like reference numerals denote the same or like components in the first embodiment.

Figure 33:
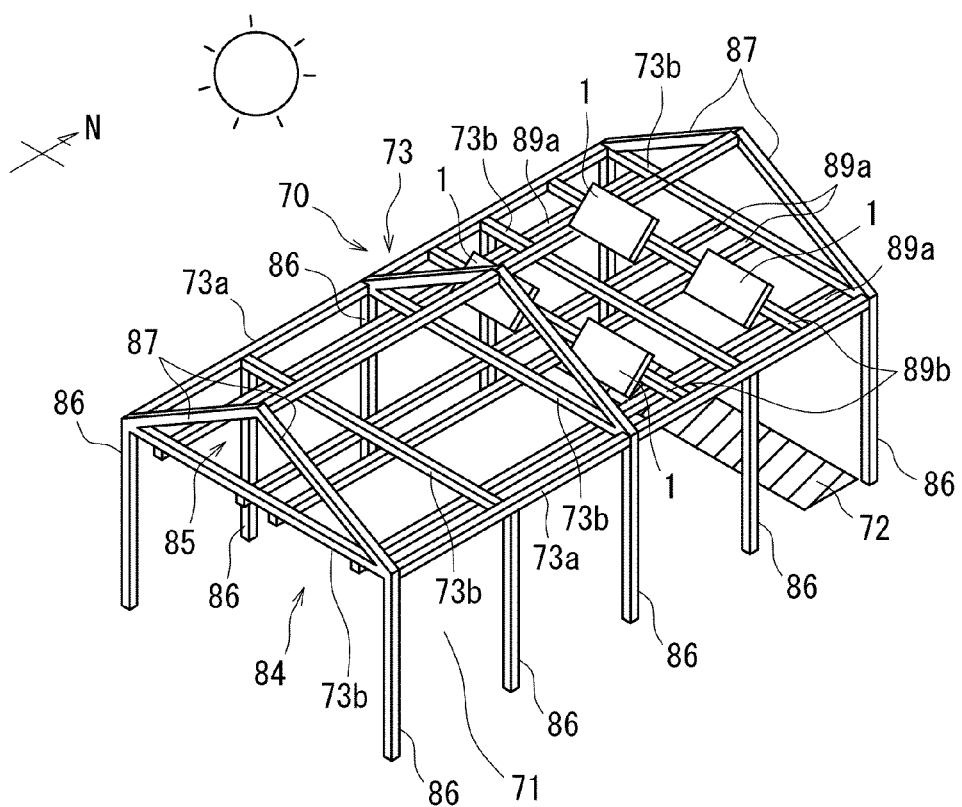
FIG. 33 is a schematic diagram similar to FIG. 8 in a fifteenth embodiment of the present invention.

As shown in FIG. 33, an agricultural greenhouse 70 includes multiple posts 86, a beam 73 connecting the upper ends of the posts 86 with one another, and principal rafters 87 that are located on the top of the beam 73 and define the framework of a gabled roof. The agricultural greenhouse 70 has a rectangular outline in a plan view, with six posts 86 installed at the four corners of the outline and near the midpoints of a pair of long sides of the outline. The beam 73 includes a pair of long beams 73a extending along the long sides of the outline and multiple short beams 73b each connecting the upper ends of two posts 86 aligned in a short-side direction of the outline. The beam 73 further includes first auxiliary beams 89a and second auxiliary beams 89b within an area surrounded by the long beams 73a and the short beams 73b. The first auxiliary beams 89a extend parallel to the long beams 73a. The second auxiliary beams 89b extend parallel to the short beams 73b. The inside of the agricultural greenhouse 70 can be roughly divided into an upper space 85 above the beam 73 and a cultivation space 84 below the beam 73. The cultivation space 84 can be roughly divided into the cultivation area 71 in the south and the non-cultivation area 72 in the north.

The agricultural greenhouse 70 includes one or more heat collectors 1. Although FIG. 33 shows four heat collectors 1, the number of heat collectors 1 may be changed. Each heat collector 1 is supported by the beam 73 (specifically, the auxiliary beams 89a and 89b) with its longitudinal direction (X-direction) along a short-side direction of the agricultural greenhouse 70 in a plan view. In the present embodiment, the beam 73 in the agricultural greenhouse 70 serves as a support base for supporting the heat collectors 1. The four heat collectors 1 are arranged at equal intervals in a long-side direction of the agricultural greenhouse 70 in a plan view.

Figure 34:
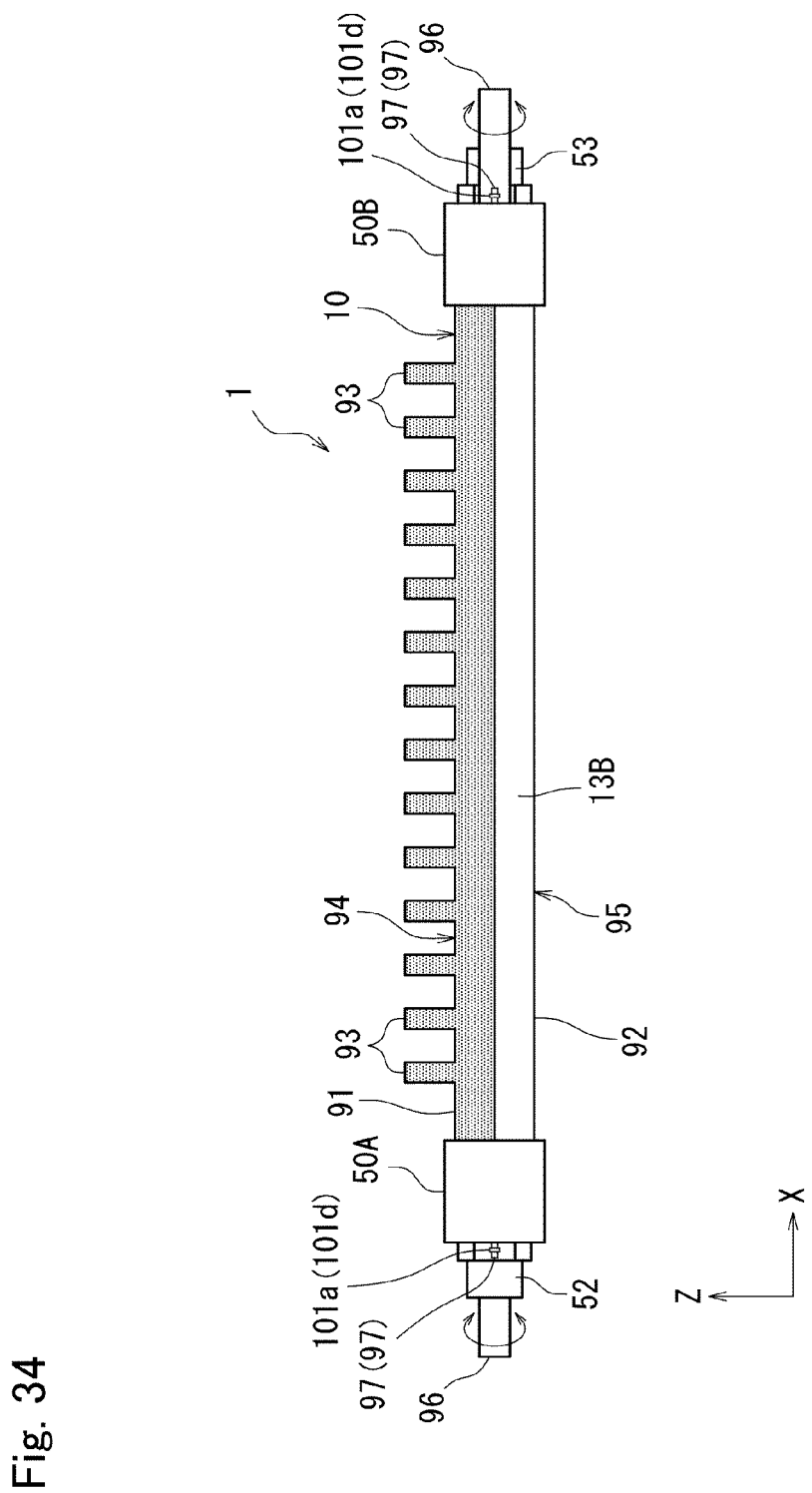
FIG. 34 is a side view of a heat collector according to the fifteenth embodiment of the present invention.

Referring to FIG. 34, each heat collector 1 is a panel in the present embodiment as well. In other words, the heat collector 1 is an elongated rectangular prism with a low height. The heat collector 1 includes the body 10 and the pair of lids 50A and 50B as in the embodiments described above. The heat collector 1 may include, as its internal flow channels, meandering flow channels as in the first embodiment or may include unidirectional flow channels as in the thirteenth embodiment.

In the above embodiments, two walls each having a larger rectangular surface, of the four walls defining the outer shape of the body 10, are referred to as the upper wall 11 and the lower wall 12. In the present embodiment, the two walls are referred to as a first wall 91 as a front surface and a second wall 92 as a back surface. In the present embodiment, the wall to face upward is selectable between the walls 91 and 92 by rotation of the heat collector 1.

The first wall 91 includes multiple fins 93 on its outer surface. The fins 93 may be integral with the body 10 or may be joined to the first wall 91 with a joining method such as welding. Although each fin 93 extends in a transvers direction of the body 10 (Y-direction) and the multiple fins 93 are arranged at intervals in the longitudinal direction of the body 10 (X-direction) in the present embodiment, this is a mere example. The number of fins 93, the direction in which the fins 93 extend, and the direction in which the fins 93 are arranged may be changed as appropriate.

The body 10 includes a heat collecting portion 94 on its front surface including the first wall 91 and the fins 93. The body 10 includes a reflective portion 95 on its back surface including the second wall 92. The heat collecting portion 94 receives sunlight and collects heat from the received sunlight. The reflective portion 95 receives sunlight and reflects the received sunlight.

The heat collecting portion 94 includes a black-painted outer surface of the first wall 91 and black-painted surfaces of the fins 93 in the body 10. The body 10 in the present embodiment is formed from an aluminum alloy. The reflective portion 95 is a portion of the body 10 with the material being exposed (e.g., unpainted). Another material painted with paint that reflects light may be used. In the illustrated example, the side wall 13B is partially painted black for ease of illustration of the heat collecting portion 94. However, the heat collecting portion 94 is located on at least the outer surface of the first wall 91, and may not be on the side wall 13B.

A pair of rotational shafts 96 protruding in the longitudinal direction of the heat collector 1 (X-direction) are located on the outer surfaces of the pair of lids 50A and 50B. The pair of rotational shafts 96 are coaxial with each other. The pair of rotational shafts 96 are rotatably supported by bearings (not shown) in the support base. This allows the heat collector 1 and the body 10 in the heat collector 1 to be supported at an angle adjustable with respect to the agricultural greenhouse 70 about the rotational shafts 96. In the present embodiment, the short-side direction of the agricultural greenhouse 70 in a plan view is in the direction from the east to the west. The rotational shafts 96 are thus directed in the east-west direction. The panel can thus be directed to the sun by changing the angle in response to the altitude of the sun.

Figure 35:
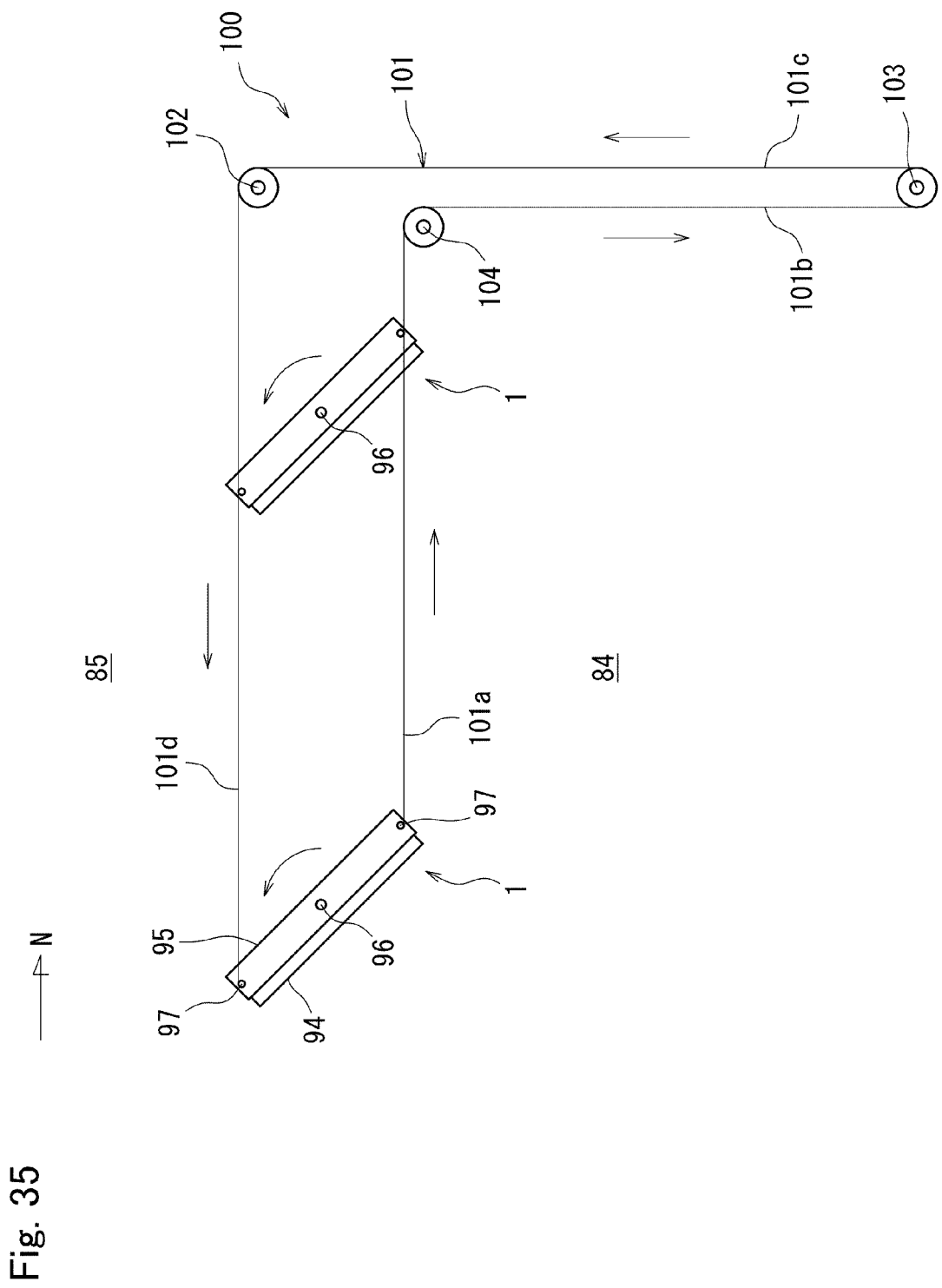
FIG. 35 is a schematic diagram of a rotator in the fifteenth embodiment of the present invention.

As shown in FIG. 35, the agricultural greenhouse 70 including multiple heat collectors 1 includes a rotator 100 that synchronously changes angles at which the multiple heat collectors 1 are mounted on the structural members. The rotator 100 may be operated manually or automatically with a driving force generated by an actuator such as an electric motor. FIG. 35 shows an example manual operation.

The rotator 100 includes a cable 101 and multiple pulleys 102 to 104 on which the cable 101 is placed. The cable 101 includes a first upper portion 101a, a first vertical portion 101b, a second vertical portion 101c, and a second upper portion 101d. The first upper portion 101a, the first vertical portion 101b, the second vertical portion 101c, and the second upper portion 101d are continuous with one another in this order.

The first upper portion 101a extends along the support base and is sequentially secured to one lateral end of a longitudinal end face of each multiple heat collector 1. The first vertical portion 101b extends downward from the first upper portion 101a. The second vertical portion 101c extends upward from the lower end of the first vertical portion 101b. The second upper portion 101d extends along the support base and is sequentially secured to the other lateral end of the longitudinal end face of each multiple heat collector 1. The pair of lids 50A and 50B include locks 97 (refer to FIG. 34) that lock the first upper portion 101a and the second upper portion 101d.

The first vertical portion 101b and the second vertical portion 101c have their lower ends within the cultivation space 84. In response to the first vertical portion 101b being pulled downward by a worker in the agricultural greenhouse 70, the four heat collectors 1 synchronously rotate counterclockwise as in FIG. 35. In response to the second vertical portion 101c being pulled downward by the worker in the agricultural greenhouse 70, the four heat collectors 1 synchronously rotate clockwise as in FIG. 35. The angles of the heat collectors 1 are synchronously changed by the action of the rotator 100 between a heat collecting position at which the heat collecting portion 94 is directed upward and a light-blocking position at which the reflective portion 95 is directed upward.

Figure 36A:
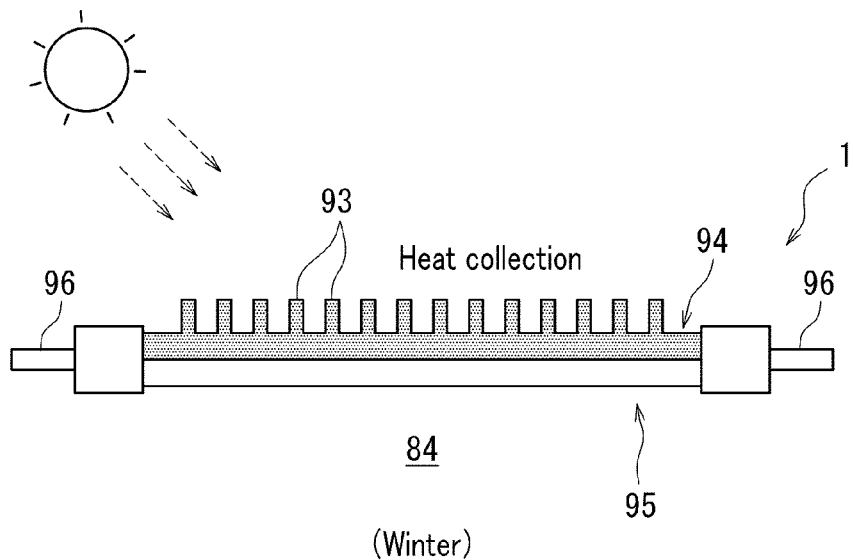
FIG. 36A is a schematic diagram of the heat collector according to the fifteenth embodiment of the present invention at a heat collecting position.

As shown in FIG. 36A, with the heat collector 1 at the heat collecting position, the reflective portion 95 faces the cultivation space 84, whereas the heat collecting portion 94 receives sunlight. The heat collecting portion 94 collects heat from sunlight, thus heating the heating medium flowing through the heat collector 1. The fins 93 function as the heat collecting portion 94. This allows the heat collecting portion 94 to have a large surface area relative to the plane area of the heat collector 1 and thus to collect heat highly efficiently. In winter, the heat collecting portion 94 may be directed upward, thus easily maintaining the cultivation space 84 at a temperature appropriate for cultivation.

Figure 36B:
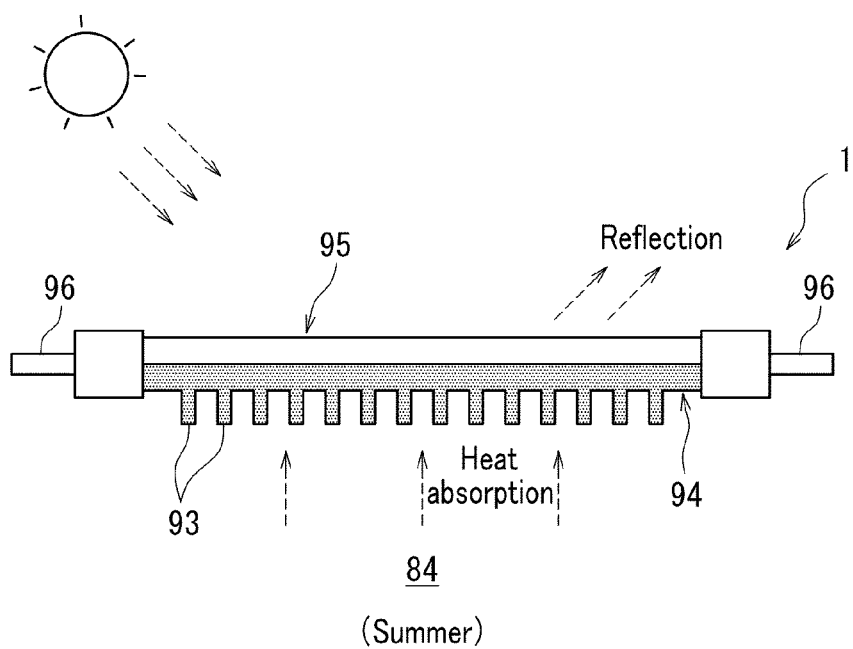
FIG. 36B is a schematic diagram of the heat collector according to the fifteenth embodiment of the present invention at a light-blocking position.

As shown in FIG. 36B, with the heat collector 1 at the light-blocking position, the heat collecting portion 94 faces the cultivation space 84, whereas the reflective portion 95 receives sunlight. The reflective portion 95 reflects sunlight. Solar energy is thus not used to raise the temperature of the heating medium. In the cultivation space 84, the temperature tends to be high in an upper area due to convective heat transfer. The heat collecting portion 94 absorbs heat rays from the upper area of the cultivation space 84. When the temperature rises inappropriately in the cultivation space 84, the heat collecting portion 94 absorbs heat to adjust the temperature in the cultivation space 84 to an appropriate temperature. The fins 93 function as the heat collecting portion 94, thus absorbing heat more effectively. In summer, the reflective portion 95 may be directed upward and the heat collecting portion 94 may be directed to the cultivation space 84, thus easily maintaining the cultivation space 84 at a temperature appropriate for cultivation.

As described above, when built in a region in which the temperature varies largely throughout the year, the agricultural greenhouse 70 according to the present embodiment can easily maintain the cultivation space 84 at an appropriate temperature throughout the year.

EXPLANATION OF REFERENCES 1 heat collector
10 body
11 upper wall
11a first upper wall portion
11b second upper wall portion
11c upper surface (light-receiving surface)
12 lower wall
12a first lower wall portion
12b second lower wall portion
12c lower surface
13A, 13B side wall
14A, 14B, 14C, 14D, 14E, 14F partition wall
15 first end
16 second end
17A, 17C, 17E, 17G first flow channel
17B, 17D, 17F second flow channel
18A, 18B, 18C, 18D, 18E, 18F, 18G first opening
19A, 19B, 19C, 19D, 19E, 19F, 19G second opening
20 hollow portion
22A, 22B, 22C, 22D, 22E, 22F connection hole
30 stepped portion
31A, 31B, 31C, 31D, 31E, 31F step
32 curved portion
33A, 33B, 33C rib (first rib)
34A, 34B flange
35A, 35B upper surface (light-receiving surface)
36A, 36B, 36C black film
37A, 37B, 37C, 37D, 37E heat insulator
38A, 38B lower surface
39A, 39B outer surface
40 outer surface
41 rib (second rib)
42A, 42B, 42C recess (first recess)
43 recess (second recess)
50A, 50B lid
51 recessed portion
52 inlet
53 outlet
54 base
55A, 55B, 55C, 55D, 55E, 55F connection channel
56A, 56B inlet/outlet flow channel
70 agricultural greenhouse
71 cultivation area
72 non-cultivation area
73 beam
74 support
76 rotary plate
77 leg
78 tank
79 pump
80 controller
81 radiator
82 three-way valve
83 curtain
84 cultivation space
85 upper space
86 post
86a web

The invention claimed is:

1. A heat collector, comprising:
a body including a hollow portion extending from a first end to a second end of the body, the body being a metal-extruded body having a light-receiving surface to be irradiated with sunlight;

a pair of lids adjacent to the first end and the second end, respectively, the pair of lids covering the hollow portion;

an inlet located in one of the pair of lids to allow a heating medium to enter the hollow portion; and an outlet located in one of the pair of lids to allow the heating medium to exit the hollow portion.

2. The heat collector according to claim 1, wherein the hollow portion includes a first flow channel through which the heating medium flows from the first end toward the second end, and a second flow channel through which the heating medium flows from the second end toward the first end, the second flow channel being adjacent to the first flow channel with a partition wall between the first flow channel and the second flow channel.

3. The heat collector according to claim 2, wherein the partition wall has a connection hole connecting the first flow channel and the second flow channel to cause the heating medium to meander from the inlet toward the outlet.

4. The heat collector according to claim 2, wherein each of the pair of lids includes a connection channel connecting the first flow channel and the second flow channel to cause the heating medium to meander from the inlet toward the outlet.

5. The heat collector according to claim 2, wherein the first flow channel aligned with the inlet has a smaller flow channel cross-sectional area than the second flow channel.

6. The heat collector according to claim 2, wherein the hollow portion includes a plurality of the first flow channels through which the heating medium flows from the first end toward the second end, and the plurality of first flow channels are adjacent to one another with a partition wall between adjacent first flow channels of the plurality of first flow channels.

7. The heat collector according to claim 6, wherein each of the pair of lids includes a common channel connecting with opening ends of the plurality of first flow channels to cause the heating medium to flow from the inlet to the plurality of first flow channels, merge after flowing through the plurality of first channels, and flow toward the outlet.

8. The heat collector according to claim 6, wherein the body includes a plurality of recesses adjacent to the first end and the second end, the plurality of recesses connect ends of the plurality of first flow channels, and each of the pair of lids includes an inlet/outlet flow channel connecting the inlet or the outlet with one of the plurality of recesses.

9. The heat collector according to claim 1, further comprising:

a support supporting the body at an adjustable angle.

10. The heat collector according to claim 9, wherein the body is a panel, the body includes a heat collecting portion on a front surface of the panel and a reflective portion on a back surface of the panel, the heat collecting portion collects heat from the received sunlight, and the reflective portion reflects the received sunlight, and the support supports the body at an angle of the body adjustable between a heat collecting position at which the heat collecting portion faces upward and a light-blocking position at which the reflective portion faces upward.

11. The heat collector according to claim 10, wherein the heat collecting portion includes a cover covering the front surface of the body and a fin protruding from the cover.

12. The heat collector according to claim 10, wherein the heat collecting portion is painted black.

13. The heat collector according to claim 10, wherein the body comprises aluminum or an aluminum alloy, and the reflective portion is the back surface with the aluminum or the aluminum alloy being exposed.

14. The heat collector according to claim 1, wherein the body includes a stepped portion in a cross section perpendicular to a direction in which the body extends.

15. The heat collector according to claim 1, wherein the body includes a curved portion in a cross section perpendicular to a direction in which the body extends.

16. The heat collector according to claim 1, wherein the hollow portion includes a first rib in a direction in which the hollow portion extends.

17. The heat collector according to claim 1, wherein the hollow portion includes a first recess in a direction in which the hollow portion extends.

18. The heat collector according to claim 1, wherein the light-receiving surface includes a second rib in a direction in which the body extends.

19. The heat collector according to claim 1, wherein the light-receiving surface includes a second recess in a direction in which the body extends.

20. The heat collector according to claim 1, wherein the light-receiving surface is coated with a black film.

21. The heat collector according to claim 1, further comprising:

a heat insulator on an outer surface of the body except the light-receiving surface.

22. The heat collector according to claim 1, wherein the body includes an upper wall being a plate, a lower wall being a plate and facing the upper wall, and a pair of side walls each connecting an end of the upper wall and an end of the lower wall.

23. The heat collector according to claim 22, wherein the upper wall includes flanges protruding from the upper wall beyond the pair of side walls, and the light-receiving surface includes an upper surface of the upper wall and upper surfaces of the flanges to face the sun.

24. The heat collector according to claim 22, wherein the partition wall is thicker than the upper wall, the lower wall, and the pair of side walls.

25. An agricultural greenhouse, comprising:

one or more heat collectors, each of the one or more heat collectors comprising:

a body including a hollow portion extending from a first end to a second end of the body, the body being a metal-extruded body having a light-receiving surface to receive sunlight;

a pair of lids adjacent to the first end and the second end, the pair of lids covering the hollow portion;

an inlet located in one of the pair of lids to allow a heating medium to enter the hollow portion; and an outlet located in one of the pair of lids to allow the heating medium to exit the hollow portion.

26. The agricultural greenhouse according to claim 25, wherein each of the one or more heat collectors includes the body being a panel and supported by a structural member of the agricultural greenhouse at an adjustable angle, the body includes a heat collecting portion on a front surface of the panel and a reflective portion on a back surface of the panel, the heat collecting portion collects heat from received sunlight, and the reflective portion reflects received sunlight, and the agricultural greenhouse further comprises a rotator configured to synchronously change angles of the one or more heat collectors with respect to the structural member.

* * * * *